US006129492A

United States Patent [19]

Uno

[11] Patent Number: 6,129,492

[45] Date of Patent: Oct. 10, 2000

[54] DEVICE AND TOOL FOR SECURING ELECTRICAL CONDUCTION AT CONNECTIONS

[75] Inventor: Tsuyoshi Uno, Gifu, Japan

[73] Assignee: Nakasu Denki Kabushikigaisha, Gifu, Japan

[21] Appl. No.: 08/983,286

[22] PCT Filed: Sep. 2, 1996

[86] PCT No.: PCT/JP96/02474

§ 371 Date: Jan. 13, 1998

§ 102(e) Date: Jan. 13, 1998

[87] PCT Pub. No.: WO97/09751

PCT Pub. Date: Mar. 13, 1997

[30] Foreign Application Priority Data

| | | | |
|---|---|---|---|
| Sep. 4, 1995 | [JP] | Japan | 7-226518 |
| Apr. 1, 1996 | [JP] | Japan | 8-079048 |
| May 21, 1996 | [JP] | Japan | 8-125623 |

[51] Int. Cl.[7] .............................. F16B 33/00; F16B 39/24

[52] U.S. Cl. .......................... 411/161; 411/163; 411/368; 411/544; 439/433

[58] Field of Search .................................... 411/158, 159, 411/160, 161, 162, 163, 368, 369, 542, 544, 909; 439/433, 434

[56] References Cited

U.S. PATENT DOCUMENTS

| | | | |
|---|---|---|---|
| 2,014,231 | 9/1935 | Garrett | 411/158 |
| 2,289,066 | 7/1942 | Olson | 411/163 X |
| 2,778,399 | 1/1957 | Mroz | 411/161 |
| 3,097,679 | 7/1963 | Jordan | 411/158 X |
| 4,880,343 | 11/1989 | Matsumoto | 411/909 X |

FOREIGN PATENT DOCUMENTS

| | | |
|---|---|---|
| 52-13250 | 1/1977 | Japan . |
| 54-98955 | 7/1979 | Japan . |
| 58-110977 | 7/1983 | Japan . |
| 61-79465 | 5/1986 | Japan . |
| 61-218077 | 9/1986 | Japan . |
| 63-4422 | 1/1988 | Japan . |
| 64-53610 | 4/1989 | Japan . |

*Primary Examiner*—Neill Wilson
*Attorney, Agent, or Firm*—Baker & Maxham

[57] ABSTRACT

Conductive devices and tools to provide electrical conduction with a generally planar conductor which is covered with an insulation substance such as paint, rust or dust, by scraping a portion of the conductor and removing the insulation substance. A conductive device includes a conductive metal serration means and a tool utilizes such a serration device. Such a serration device can be a bolt device, nut device or washer device, or washer-incorporated threaded device. A connector device is also disclosed to provide electrical conduction between a conductor and a conductor plate covered with an insulation substance.

15 Claims, 28 Drawing Sheets

FIG. 36A
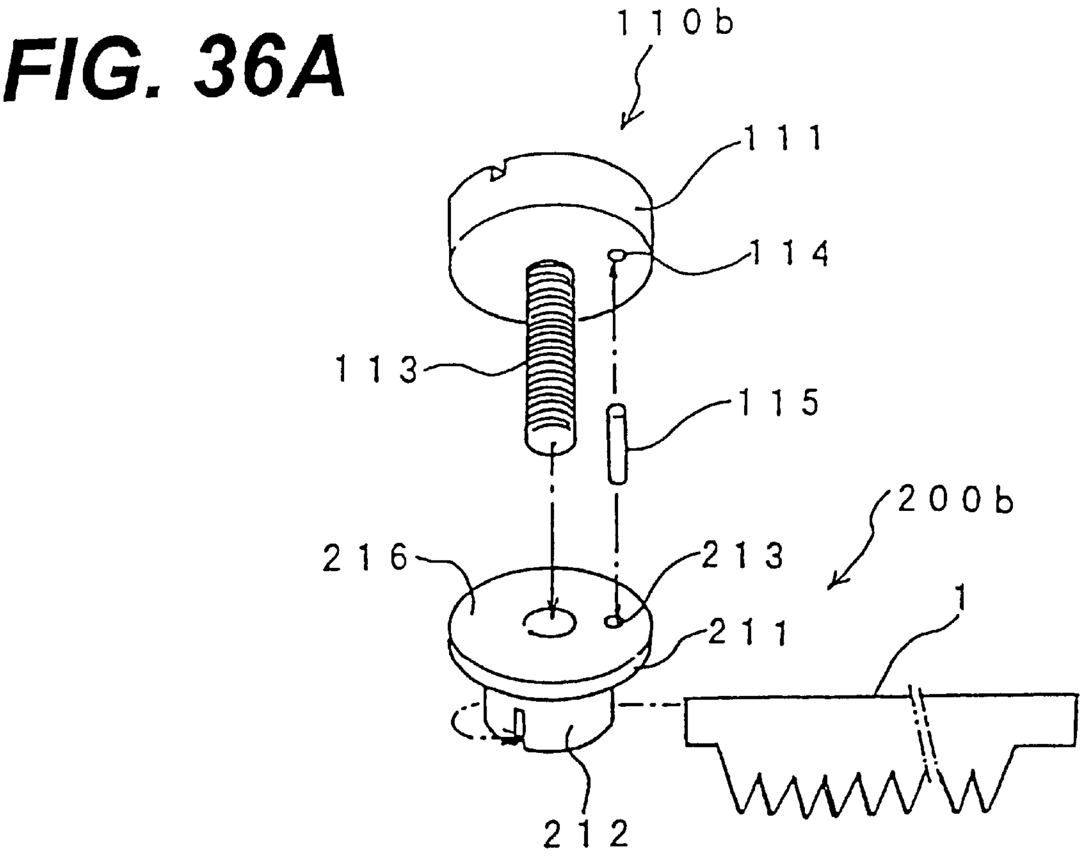
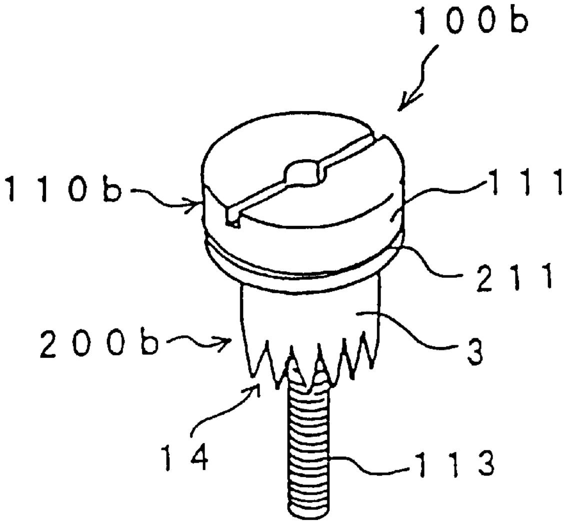
FIG. 36B

DEVICE AND TOOL FOR SECURING ELECTRICAL CONDUCTION AT CONNECTIONS

BACKGROUND

1. Field of the Invention

This invention generally relates to devices for providing efficient electrical connection with a generally planar conductor covered with an insulating layer such as paint, rust or stain.

2. Description of the Related Art

There can be various types of electrical connections between conductors. A grounding cable is often connected with an enclosure of a switchboard. A linear conductor is connected with another linear conductor by corresponding terminals. A conductor is connected to a terminal base of a distributor or a planar terminal of an electrical appliance. A large capacity transformer utilizes surface contact between two plate bars. Cables are connected to terminals of a battery. There are numerous other possible connections between conductors.

Such electrical contacts or connections are often hindered by insulating hazards covering contact portions such as paint, dust or rust. Mere connection with a conductor surface painted with insulating paint for pleasing appearance or rust inhibition often renders the connection electrically insufficient. Dust or rust may also inhibit sufficient electrical connections.

To provide an electrically sufficient connection with a planar conductor covered with an insulation layer, an appropriate portion or area on a conductor surface needs to be pretreated or scraped with a file or screwdriver for example. It is very time consuming to provide sufficient scraped areas on a large or complicated appliance, especially if there are many portions to be treated.

Some members of a complicatedly designed appliance cannot be easily or properly grounded partly due to their relative inaccessibility. It is often wishfully expected that ungrounded members of an electrical device will provide indirect grounding by the mere fact that they somehow contact grounded members, which is often proved to be a serious error.

A similar problem arises between a cable conduit and electric cables housed therein. A cable conduit is often made of a conductive material such as a metal, which is generally indirectly grounded or expected to be grounded through conductive portions of an electric apparatus to which the cables in the conduit are connected. However, such grounding is not actively constituted, thus often proving to be insufficient.

There exist a number of makeshift ways to provide grounding where such electrical connections are not originally created, such as by utilizing frames or bodies of electric appliances. Of course, originally constructed electrical connections can be made between electrical cables and terminals of electric appliances, between two flat bars where large current is involved, or between batteries and cables. Those originally created contact areas are generally prepared of copper or aluminum, which are prone to rusting, staining or dusting, possibly adversely affecting electrical connection therewith. To provide reliable electrical conduction between elements, it is often required to remove such insulating substances from the contact areas before electrical connections are made.

SUMMARY OF THE INVENTION

Accordingly, it is an object of the present invention to provide devices and tools with which to accomplish efficient and easy removal of insulating substances from portions of conductor surfaces, preferably concurrently with making electrical connection therewith.

A device of the present invention is generally a conductive threaded element having a serration portion which scrapes or clears a generally planar surface portion of a conductor plate. This invention additionally provides conductive intermediate members to further efficiently provide electric connection with a planar conductor.

Such a threaded device may be a bolt structure having a serration portion. The serration portion scrapes a surface area of a conductive material or conductor plate covered with an insulating substance as the bolt device is further fastened into a threaded hole provided in the conductor plate to clear or remove the insulating substance from the surface area.

Such a threaded device may be a nut element having a serration portion. The serration portion scrapes a surface area of a conductor plate covered with an insulating substance as the nut device is tightened and turned with a bolt to remove the insulating substance from the surface area.

Alternatively, such a threaded device may be a washer element. The serration portion scrapes a surface area of a conductor plate covered with an insulating substance as the washer is pressed against the surface and turned on the surface to remove the insulating substance from the surface area.

Such a threaded device may be a combination of a threaded structure and a washer element having a serration portion. The serration portion scrapes a surface area of a conductor plate covered with an insulating substance as the washer is pressed and turned on the surface by the threaded device when the threaded device is further screwed through a threaded hole provided in the conductor plate to remove the insulating substance from the surface area.

A tool or scraper device with a serration portion may also be provided to directly and conveniently provide scraping of a conductor surface area. A variety of tool members are additionally provided to accomplish easier and improved scraping of a conductor surface area.

Several embodiments of the invention are shown and described herein, and the basic characteristic aspects of this invention will be set out here briefly for the types of devices disclosed.

Serration Member

A conductive serration member is provided as a metal plate, such a copper plate, having a serration portion along a longitudinal edge, which is to be made into a single-layered or multi-layered cylindrical ring having a serration along an edge. The serration portion may advantageously be a plurality of Λ-shaped teeth. The serration member should be hard enough to efficiently scrape and clean paint or rust from a conductor surface portion when pressed and turned against the surface portion. It is not essential but advantageous that the serration member is also deformable and flattened to provide efficient electric connection after the scraping operation by providing a large contact area with the scraped conductor surface area. When a cylindrical serration member is utilized, it is advantageous that all such deformation of the serration is provided toward the inside of the cylinder. If the serration member is made of a shape memory alloy, when deformed through a use it can be restored and utilized again by appropriate heating of the deformed serration body.

Threaded Device

A conductive threaded device may be a bolt element having a serration member provided around its bolt shaft under its bolt head to form a serration device. The serration device is pressed against a surface of a conductor plate covered with an insulation substance as the bolt element is further screwed into a threaded hole provided in the conductor plate, scraping a surface area to remove the insulation substance from the surface area and provide efficient electric conduction therewith. The threaded device may alternatively be a nut element having serration member as a serration device on its surface contact face.

Washer Device

A conductive washer device has a serration element on a face. The serration element on the washer device can be turned with a bolt engaging the washer device and scrapes a conductor surface area covered with an insulation substance. The serration element is eventually deformed substantially "flat" on the conductor surface. The washer device can be independently used as a file if so desired.

Washer-Incorporated Threaded Device

A conductive washer-incorporated threaded device incorporates a washer element. The threaded device can be a bolt structure or a nut structure. This washer-incorporated threaded device provides easier and more efficient operation on a conductor surface covered with an insulating substance.

Device and Terminal Plate

A connector device is mainly used to ground a cable conduit by electrically connecting the conduit with the body portion of a switchboard or distributor. One such connector device utilizes a terminal plate to detachably mount a nut device to provide flexibility in size adjustment as cable conduits generally come in a variety of sizes.

Scraper Tool Device

A scraper tool device provides scraping of a conductor surface area covered with an insulating substance, including a serration portion and a grip handle. The tool provides handy and quick scraping of a conductor surface portion for improved electrical connection. The serration portion is gradually deformed, providing a constant and secure scraping on the conductor surface.

BRIEF DESCRIPTION OF THE DRAWING

The objects, advantages and feature of this invention will be more clearly perceived from the following detailed description, when read in conjunction with the accompanying drawing, in which:

FIGS. 36(*a*) and (*b*) show another washer-incorporated threaded device of the invention;

DETAILED DESCRIPTION OF THE PREFERRED EMBODIMENTS

Figure 1:
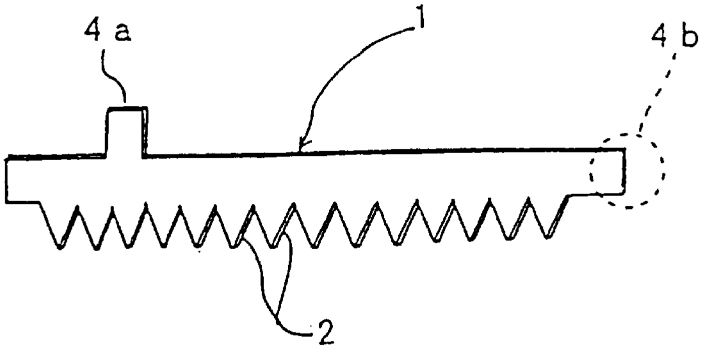
FIG. 1 shows a serration member formed in accordance with this invention.

Various embodiments are described hereinafter in detail with reference to the accompanying drawing figures. Each embodiment and the drawing figures related thereto are set out individually.

Embodiment 1

Figure 2A:
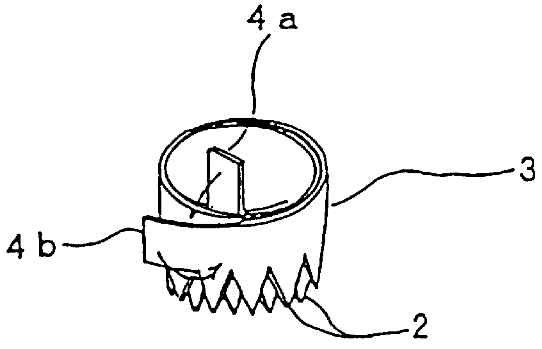
FIGS. 2(*a*) and (*b*) are perspective views of the serration member of FIG. 1, which is wound in layers into a cylinder to provide a serration device.
Figure 2B:
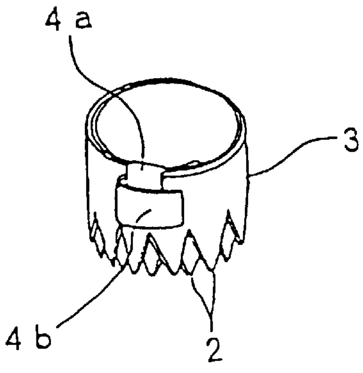

In FIG. 1 is shown a serration member 1 of the present invention, which is made from a copper plate or serration body 4 of about 0.8 mm in thickness, about 1 cm in width and about 9 cm in length. The serration member 1 has a V-shaped serration 2 of about 5 mm in depth at about 5 mm intervals along a longitudinal edge, and a stop member or projection 4*a* on the other edge to engage a hook member or end portion 4*b* provided on an end of the serration body 4. This serration member 1 is rolled into a cylindrical serration device 3 as shown in FIG. 2(*a*) and is held firmly there by hooking engagement between the projection 4*a* and the end portion 4*b* as shown in FIG. 2(*b*). The serration 2 on the serration device 3 can function as a rasp and scrapes an insulating substance such as paint, rust or dust on a portion of a metal conductor plate when pressed against the conductor surface and turned thereon. The serration device 3 may be used as an independent file on the surface if so desired.

The serration portion 2 should be hard enough to work as an effective file. It is advantageous that the serration portion 2 is also soft enough to be deformed and flattened as it scrapes a surface portion of a conductor plate to provide a wide contact area with the conductor plate so that the serration device 3 itself can provide improved electrical conduction when the removal of the insulating substance from the conductor surface portion is completed. Advantageously, the serration 2 of the serration device 3 is deformable all inside, which can be provided by slightly bending the distal end of the serration portion inside as a dome.

Figure 3:
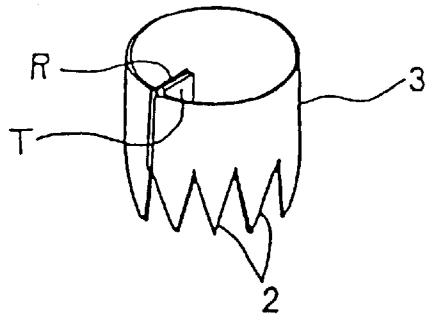
FIG. 3 is a perspective view of an alternative embodiment of the FIG. 1 member formed as a single-layered serration device.
Figure 4A:
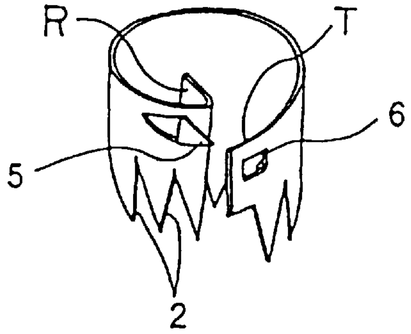
FIGS. 4(*a*) and (*b*) are perspective views of another single-layered serration device.
Figure 4B:
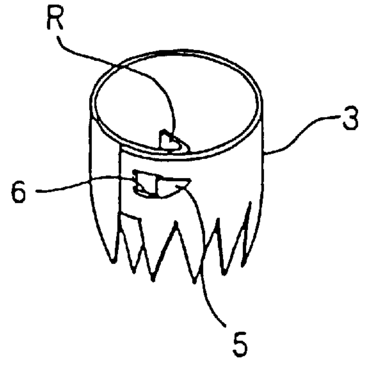
Figure 5:
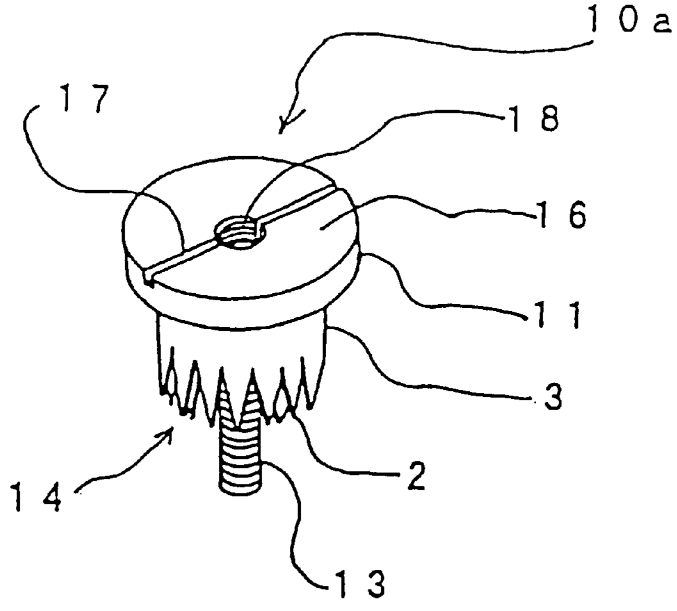
FIG. 5 shows a threaded device in perspective, which is in the form of a bolt structure.
Figure 6:
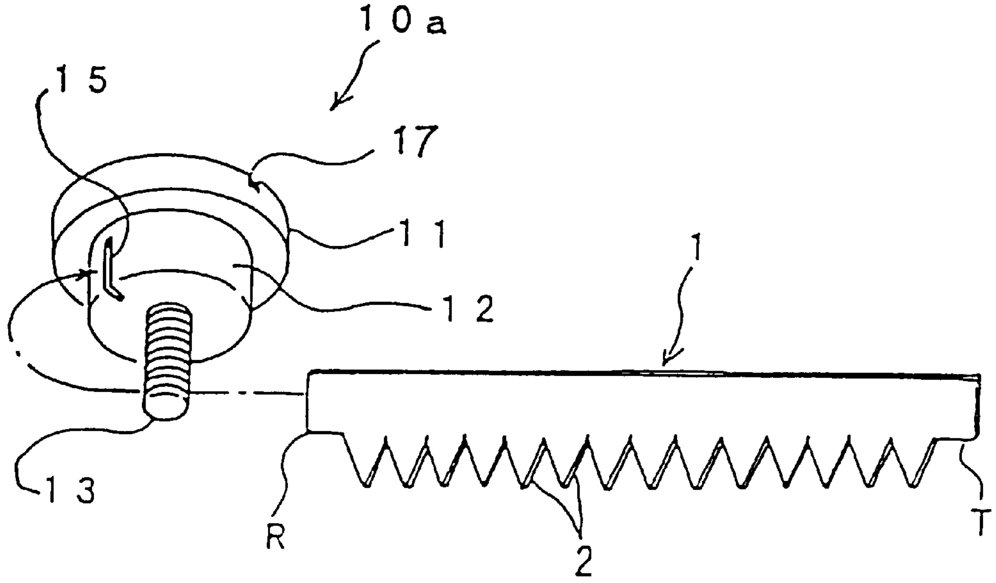
FIG. 6 is an underside perspective exploded view of the serration device of FIG. 5.

The serration body 4 may be rolled and fixed in any other appropriate way. A serration device shown in FIG. 3 has end portions R and T, which are fixed together. FIG. 4 shows another single-layered serration device 3, whose ends fixedly engage each other by engaging between a catch 5 formed near an end and a catch window 6 formed near the other end of the serration device 3 as shown in FIGS. 4(*a*) and 4 (*b*). Spot welding of both ends or between appropriate portions of a serration member 1 may be utilized to provide such fixing.

A serration member 1 may be made from a shape memory copper alloy to allow its repeated use.

Embodiment 2

Figure 7:
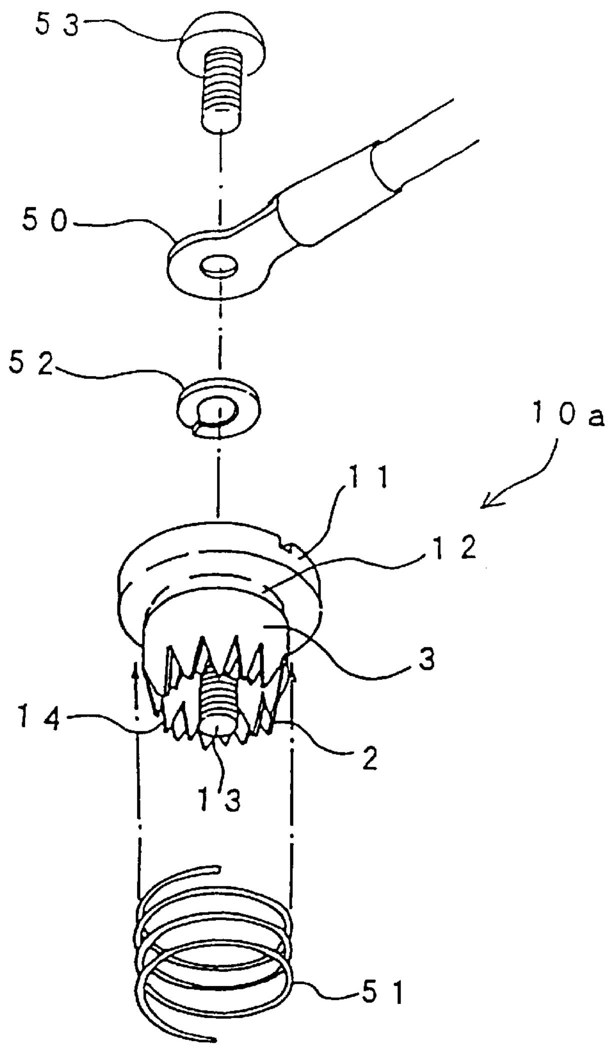
FIG. 7 is a perspective exploded view of an alterative embodiment of the threaded device of FIG. 5.

FIGS. 5–8 show a threaded device 10*a* and its modifications. The device 10*a* is a threaded bolt or bolt device. The bolt device 10*a* is screwed into a screw hole (not shown) formed in its attachment surface. A cable terminal 50 shown in FIG. 7 is to be connected to the bolt device 10*a* by means of another bolt 53 via a washer 52. The bolt 53 is screwed into a thread hole 18 provided in the bolt head 11 of the bolt device 10*a* as shown in FIG. 7.

Figure 8:
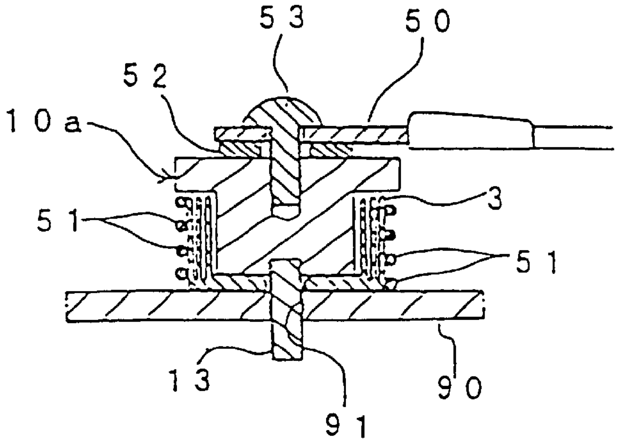
FIG. 8 is a sectional view of the threaded device of FIG. 7, shown mounted on a conductor surface.

The bolt device 10*a* has a bolt neck 12 having a stop cut 15 on the bolt neck under its bolt head 11. From the bolt neck 12 extends a bolt shaft 13. A serration member 1 is wound around the bolt neck and fixed thereon by means of engagement between the stop cut 15 and a first end R and a second end T of the serration member 1. The serration member is advantageously made of copper having serration 2 along a longitudinal edge. A coil 51 is mounted around the serration device 3 to prevent the serration member 1 from opening outside when the serration device 3 is pressed against a conductor plate 90 as shown in FIG. 8. The coil 51 also provides secure attachment of the bolt device 10*a* on the conductor surface by constantly applying pressure between the conductor surface and the thread device 10*a*. The top face 16 of the bolt device 10*a* has a diametrical screwdriver groove 17 in addition to the thread hole 18 for working with a screwdriver.

This thread device or bolt device 10*a* can be fastened onto a frame portion of a switchboard or distributor for grounding. Its serration portion 14 deforms and flattens as shown in FIG. 8 to provide improved electrical connection with a conductor plate.

The screwdriver groove 17 can be replaced by a plus-shaped groove or any other appropriately shaped groove for engagement with a corresponding fastening tool. Alternatively, the thread device 10*a* can be formed so as to be turned with a wrench or spanner.

Figure 9A:
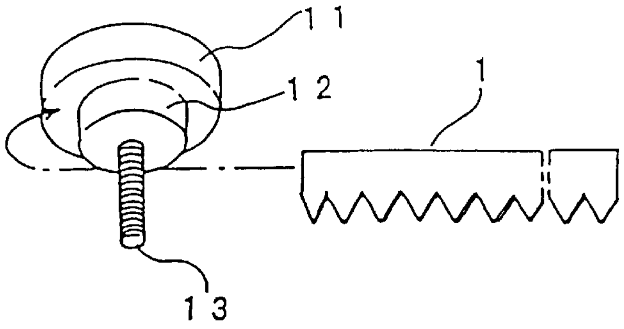
FIG. 9(*a*), (*b*) and (*c*) are perspective views of another threaded device, additionally having a ring in various stages of assembly.
Figure 9B:
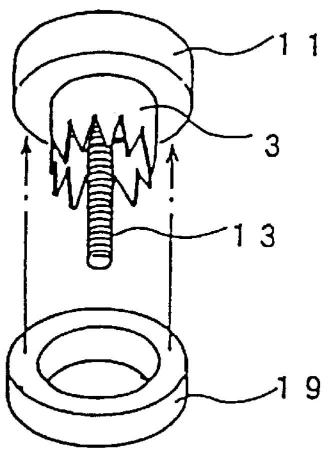
Figure 9C:
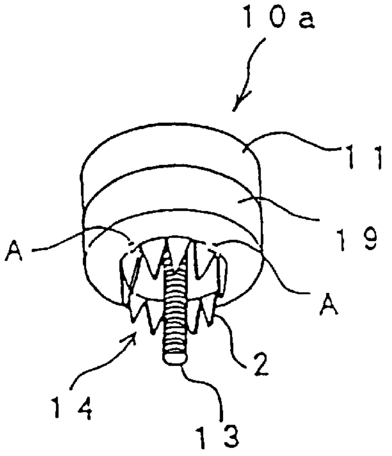

FIG. 9 shows a modified thread device 10*a* having a serration member 1 around its bolt neck 12 as shown in FIG. 9(*a*). The coil 51 is replaced by a ring 19 shown in FIG. 9(*b*), which is deformed inwardly with an appropriate tool at appropriate portions or deformation points A shown in FIG. 9(*c*) to prevent the serration member 1 from independently turning, and to fix the ring 19 on the bolt neck 12, eliminating need of a stop cut 15.

Figure 10:
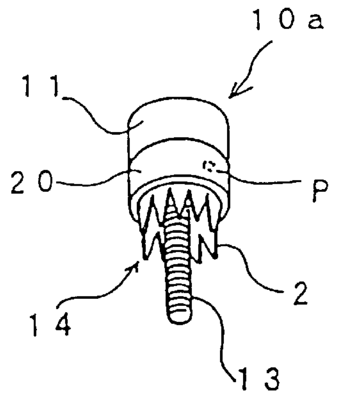
FIG. 10 shows another threaded device embodiment of the invention.

FIG. 10 shows a modification of the thread device 10*a* having a ring or cylindrical member mounted on its serration member 1 under its bolt head 11. The cylindrical member 20 is deformed inwardly at a deformation point P on its side wall instead of the deformation points A previously described so as to be fixed onto the bolt neck of the threaded device 10*a* and the serration device 3.

Figure 11:
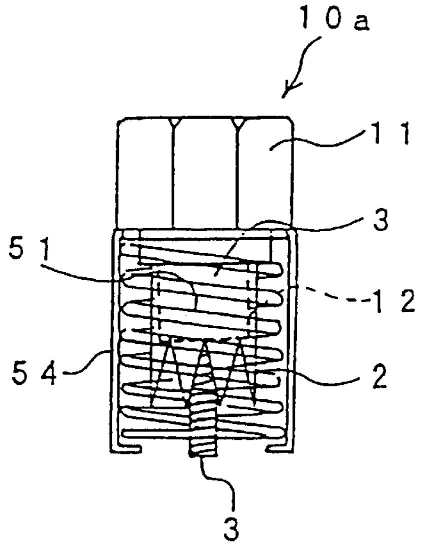
FIG. 11 shows yet another threaded device with a coil thereon constructed in accordance with the inventions.

FIG. 11 shows another threaded member 10*a* having a coil 51 provided on its serration device 3. A spring cover 54 made of a rubber or other resilient material is provided over the coil 51 under its bolt head 11 to prevent corrosion of a scraped portion on a conductor surface (not shown) by preventing entry of moist air onto the scraped portion. Bolt head 11 is shown with a shape adapted to be turned by means of a wrench.

Embodiment 3

Figure 12:
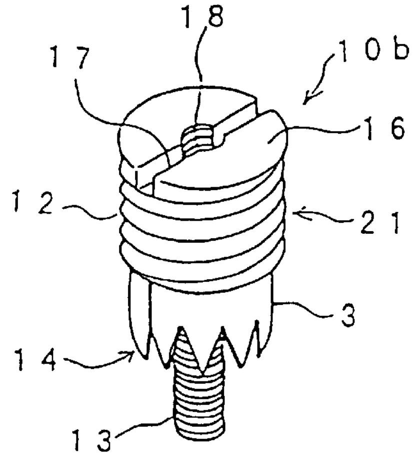
FIG. 12 is a perspective view of a further threaded device of the invention.
Figure 13:
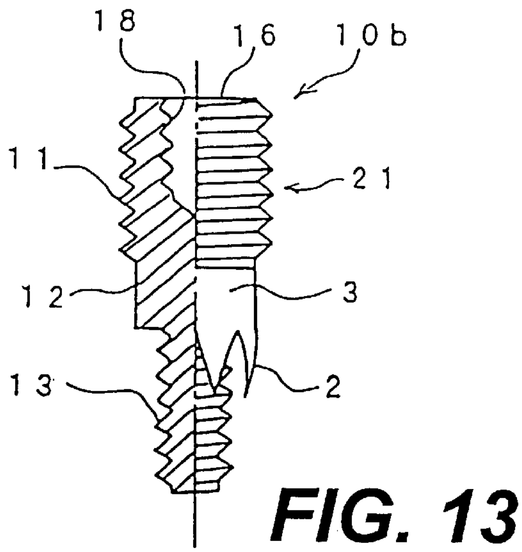
FIG. 13 is a partial sectional view of the threaded device of FIG. 12.
Figure 14:
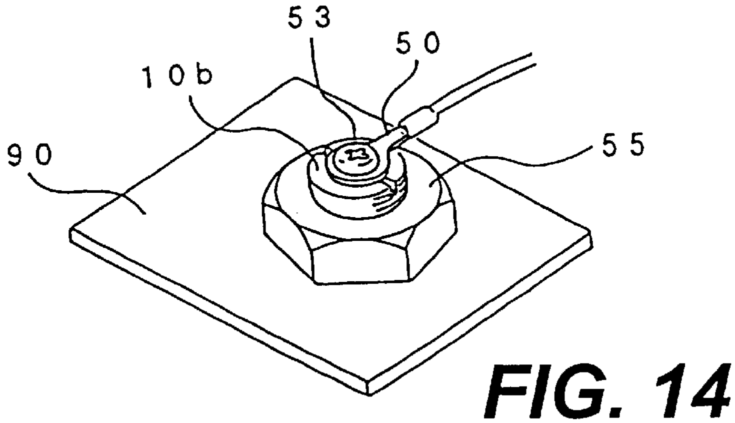
FIG. 14 shows the threaded device of FIG. 12 as mounted to a plate.

FIGS. 12 to 14 show another threaded device 10*b*. The device 10*b* has a bolt head 11, a bolt neck 12, and a bolt shaft 13. A serration member 1 is wound around the bolt neck 12 to provide a serration device 3 or serration portion 14. The bolt head 11 has a thread 21, on which a nut 55 is mounted to fixedly mount the thread device 10*b* on a conductor plate 90 as shown in FIG. 14. A cable terminal 50 is attached to the thread hole 18 provided on the top face 16 of the bolt neck or head 12 for electrical conduction with the thread device 10*b* as shown in FIG. 14. FIG. 13 shows a sectional view of the thread device 10*b*.

Figure 15:
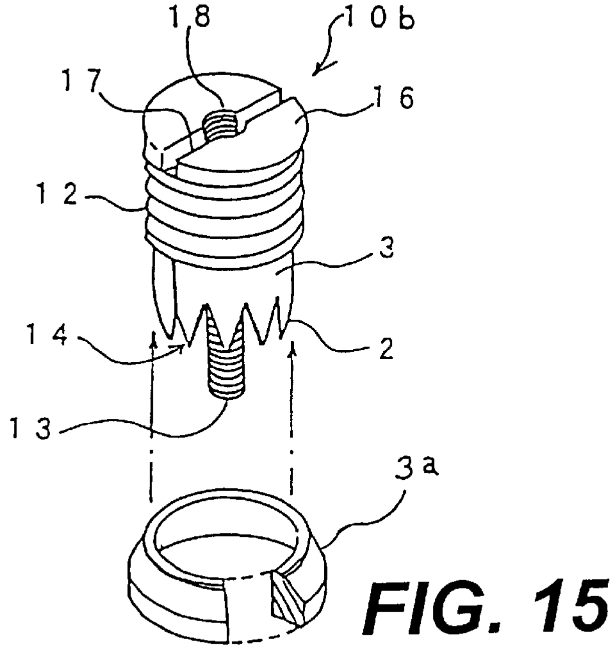
FIG. 15 shows the threaded device of FIG. 12 with the addition of a skirt element.
Figure 16:
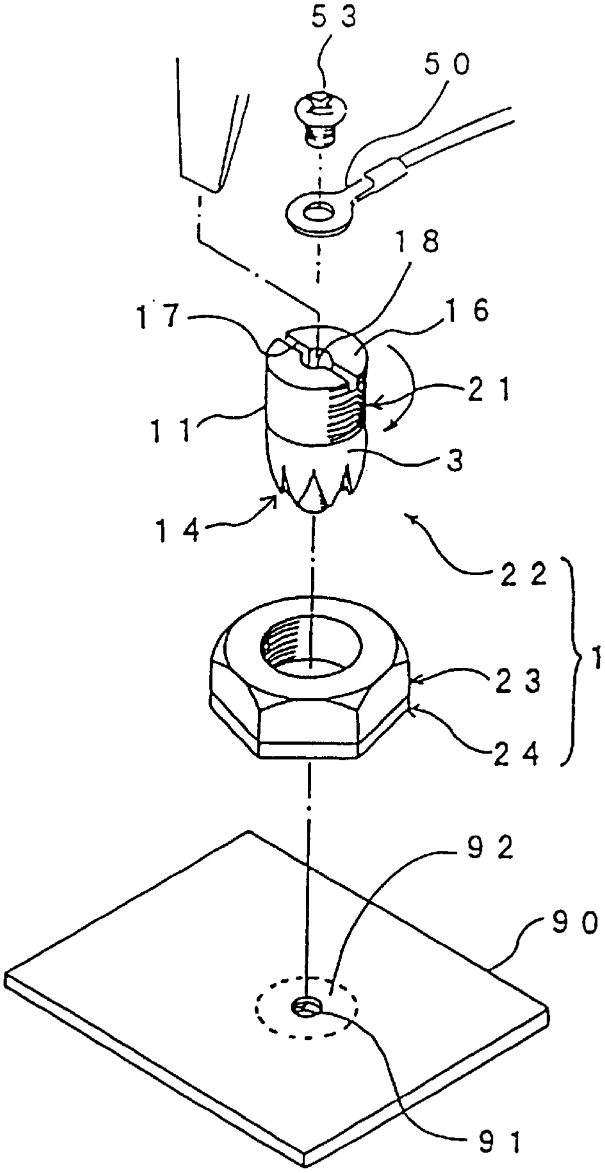
FIG. 16 is an exploded perspective view of the mounted threaded device embodiment of FIGS. 13 and 14.

As shown in FIG. 15, a skirt 3*a* may be additionally provided over the serration device 3 to protect a scraped portion (not shown) on the conductor plate 90 from corroding by preventing entry of moist air onto the scraped portion.

Embodiment 4

Another thread device 10*c* or bolt device 22 which is substantially identical with the bolt device is shown in FIGS. 16 to 19, having a bolt shaft 13 and a serration device 14 under its bolt head 11 or bolt 21 provided with a screwdriver groove 17 and an axial threaded hole 18 on its top face 16. The bolt 21 is screwed into a nut 23 and the bolt shaft 13 is screwed into a conductive hole 91 in a conductor plate 90. A packing washer 24 made of a rubber material in this embodiment is provided on the under portion of the nut 23 to protect a scraped portion of area 92 on the conductor plate 90 from corrosion. The packing washer 24 may be of any resilient material. Its thickness is preferably about 1 mm.

Figure 17:
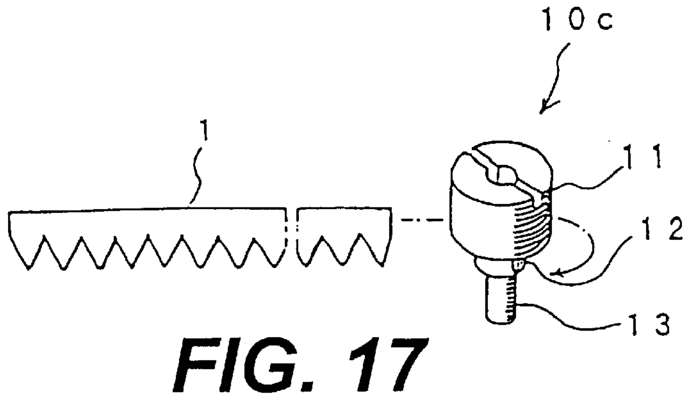
FIG. 17 is an exploded view of a portion of the threaded structure of FIG. 16.
Figure 18:
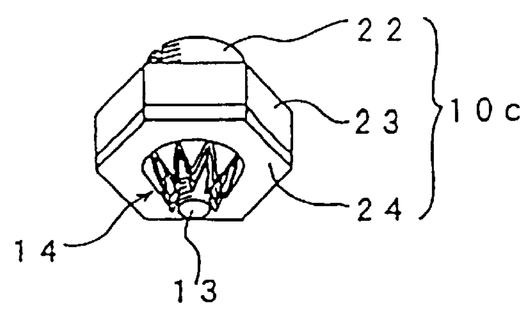
FIG. 18 shows he threaded device of FIG. 16 engaged with a nut.
Figures 19A, 19B:
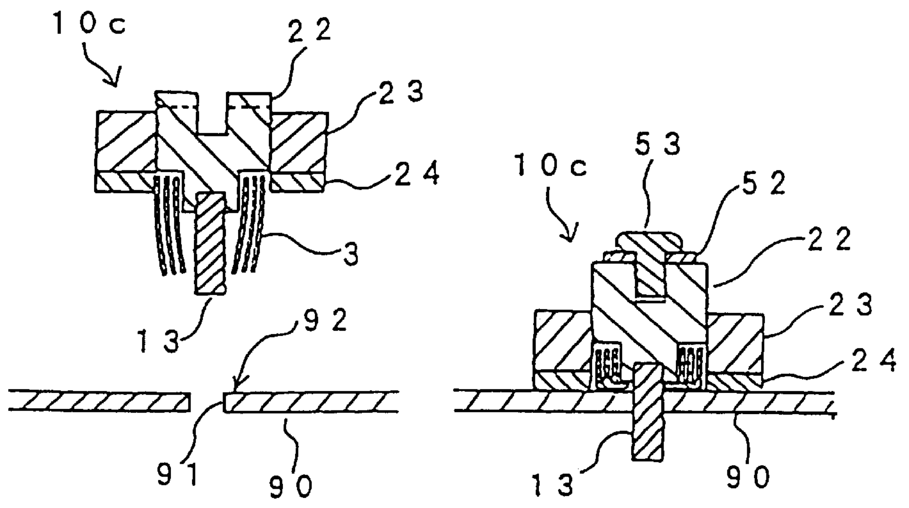
FIGS. 19(*a*) and (*b*) are cross sectional views of the threaded structure of FIG. 16 in conjunction with a conductor surface.

FIG. 17 shows how the serration member 1 is attached on the thread device 10*c*. FIG. 18 shows how the thread device 10*c* looks from below, while FIG. 19 is a sectional view of the threaded device 10*c*, showing how that threaded device is mounted into the conductive hole 91 in the conductor plate 90 (FIG. 19(*a*)) and its final appearance (FIG. 19(*b*)) after providing scraping around the conductive hole 91.

Embodiment 5

Figure 20:
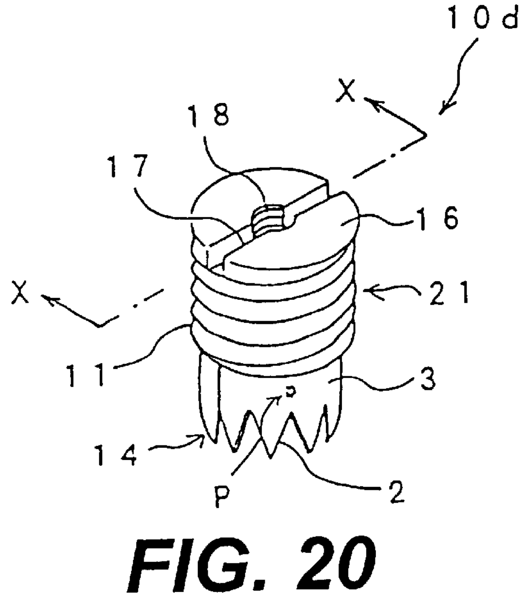
FIG. 20 shows another alternative embodiment of a threaded device of the invention.
Figure 21:
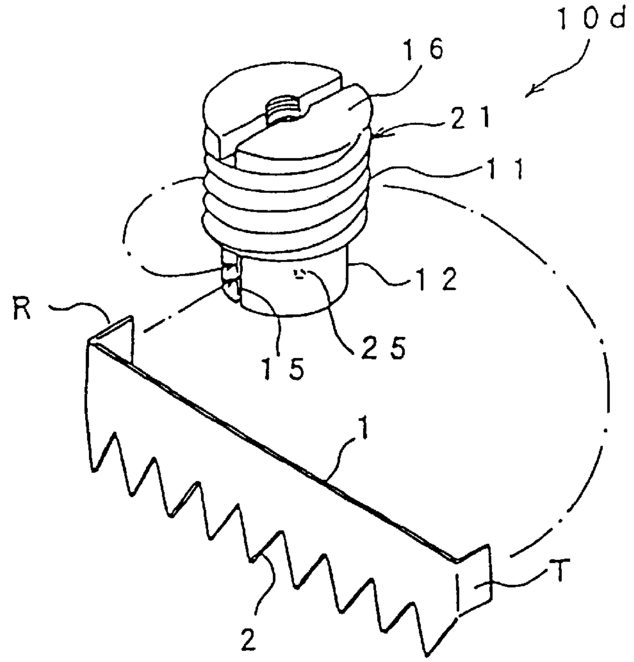
FIG. 21 is an exploded, unassembled view of the threaded device shown in FIG. 20.
Figure 22:
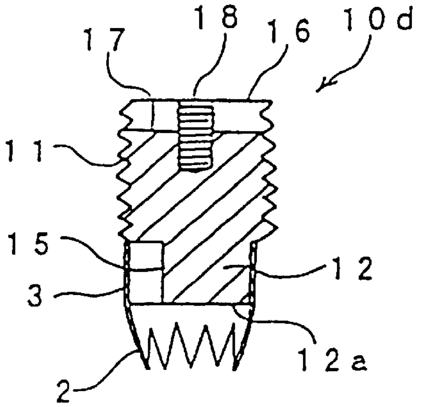
FIG. 22 a sectional view of the threaded device of FIG. 20.

FIGS. 20 to 22 show a threaded device 10*d* having a serration device 3 around its neck 12. The serration device 3 is fastened to the neck 12 by means of point pressing or deformation at a deformation point P against the neck 12. This threaded device 10*d* has a serration portion 14 at the distal end of the bolt head 11 having a thread 21 on its outer wall. The bolt head 11 has on its top face 16 a diametrical screwdriver groove 17 and an axial thread hole 18. This threaded device 10*d* is for providing scraping on a second surface under a first surface (not shown here).

FIG. 21 shows how the serration 2 having a first end R and a second end T is mounted on the neck 12. The first end R and the second end T are inserted into a stop cut 15 prepared in the neck 12 having a deformed point 25 to receive the deformation point P as deformed inwardly. FIG. 22 is a sectional view of the threaded device 10*d*.

Figure 23:
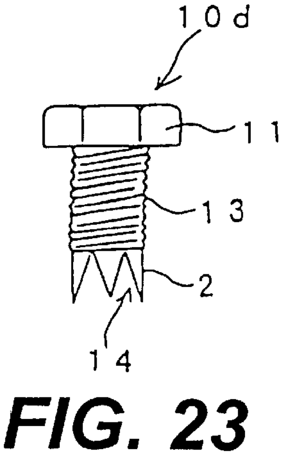
FIG. 23 shows yet another embodiment of a threaded device according to the invention.

FIG. 23 shows another threaded device 10*d*, which has a serration portion 14 at the distal end of its bolt shaft 13 in a unit. This serration portion 14 can be provided directly from the bolt shaft 13 by appropriate cutting process. Such a serration portion is advantageously hardened by a hardening treatment. This threaded device 10*d* is provided with a polygonal bolt head 11 so that a spanner (not shown) is used instead of a screwdriver (not shown) to fasten the threaded device 10*d* into a first conductor plate and provide scraping on a second conductor surface behind the first conductor plate.

Figure 24:
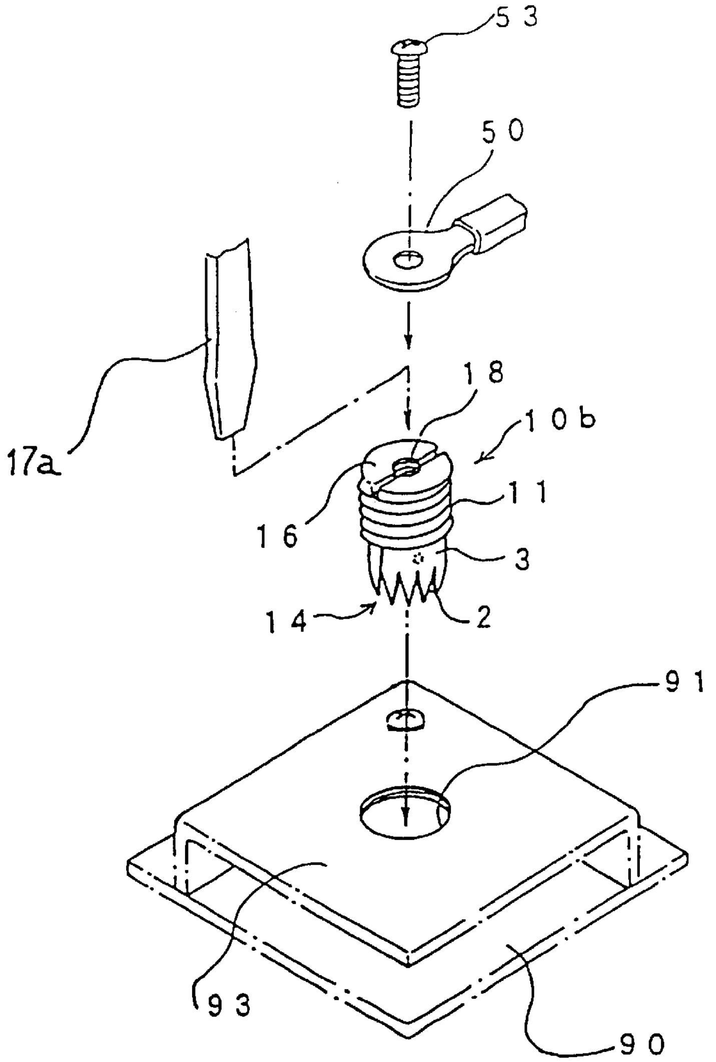
FIG. 24 is a exploded view of the threaded device of FIG. 20 mounted on a double-decked conductor.
Figure 27:
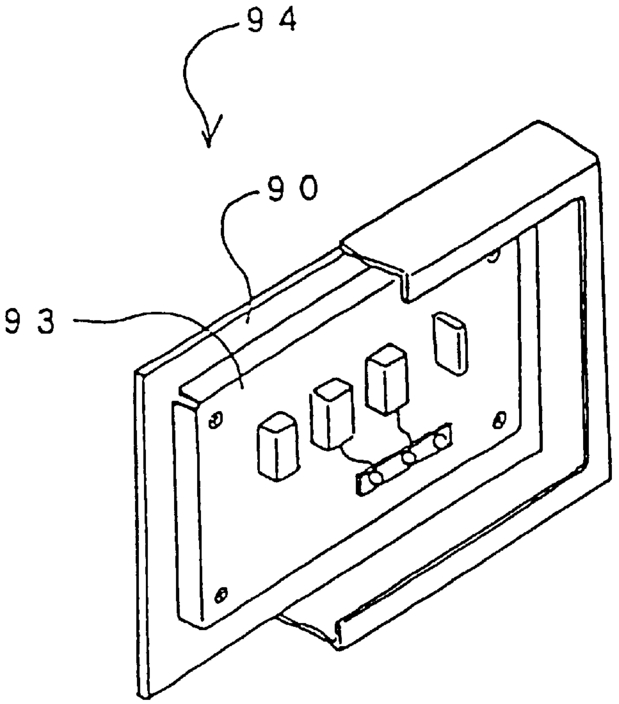
FIG. 27 is a perspective view of an assembly of a switchboard showing an example of a double-decked conductor to which the device of this invention can be mounted.

FIG. 24 shows how such a threaded device 10*d* is used. The device 10*d* is screwed into a conductive hole 91 in a first conductor plate 93 using, for example, screwdriver 17*a*. Its serration portion 14 reaches a second conductor plate 90 provided beyond the first plate 93. The first plate 93 and the second plate 90 may be those mounted in a switchboard 94 as shown in FIG. 27 for attaching various electric devices. The first plate 93 is generally apart from the second plate 90 by about 5–10 mm. Accordingly, the threaded device 10*d* is generally given a dimension which appropriately fits in this gap. The threaded device 10*d* scrapes a portion of the second plate 90 and removes an insulation substance from the surface portion, providing electrical conduction between the two plates 90 and 93 through the threaded device 10*d*.

Figure 25:
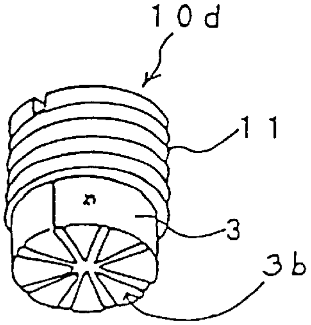
FIG. 25 shows the threaded device of FIG. 20 with the serration element completely deformed.
Figure 26:
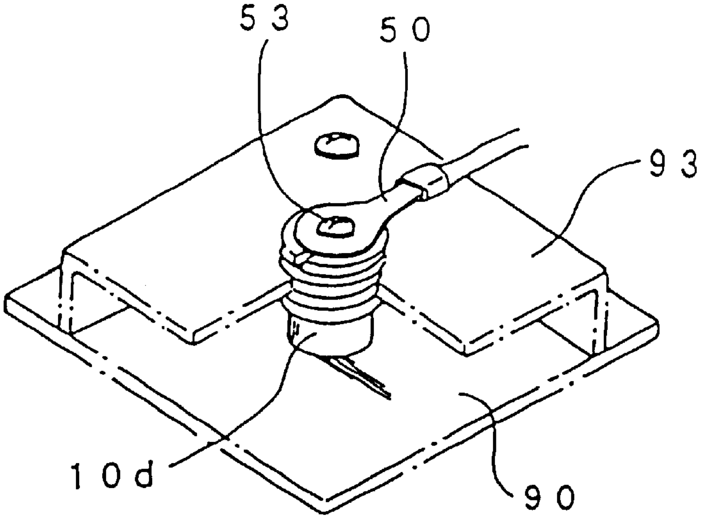
FIG. 26 shows the embodiment of FIG. 24 in assembled form.

FIG. 25 shows how the serration device 3 is deformed in the end (3*b*) on the second plate 90. FIG. 26 shows the threaded device 10*d* mounted on the plated 90 and 93, which is connected with a cable terminal 50 by a screw 53.

Figure 28:
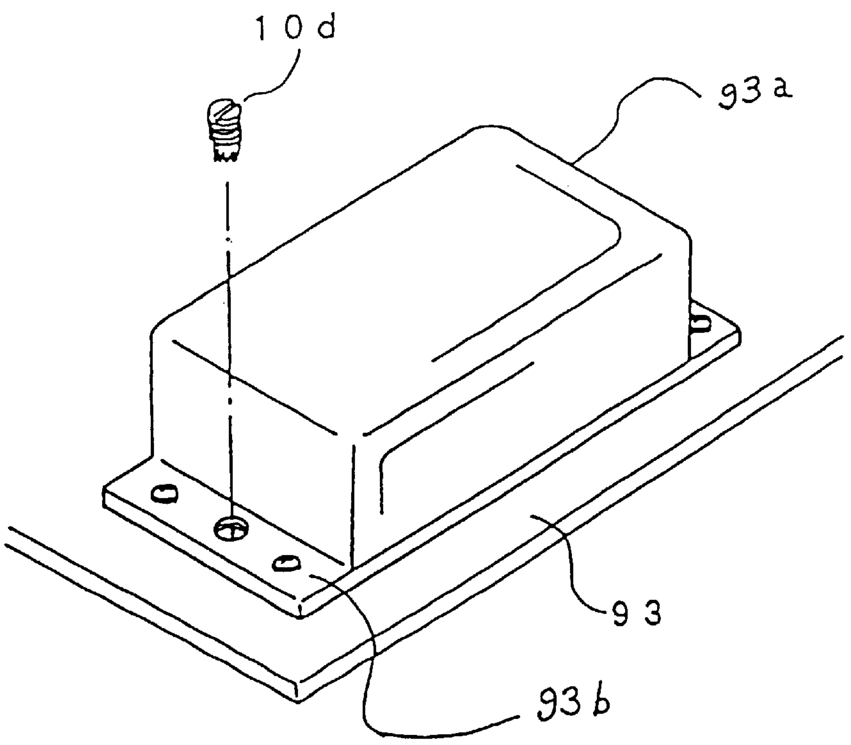
FIG. 28 shows the threaded device of FIG. 20 in a different use.

FIG. 28 shows another use of the threaded device 10*d* to electrically connect an electric device 93*a* onto conductor plate 93 covered with an insulating substance by means of the threaded device through flange 93*b*.

Embodiment 6

Figure 29:
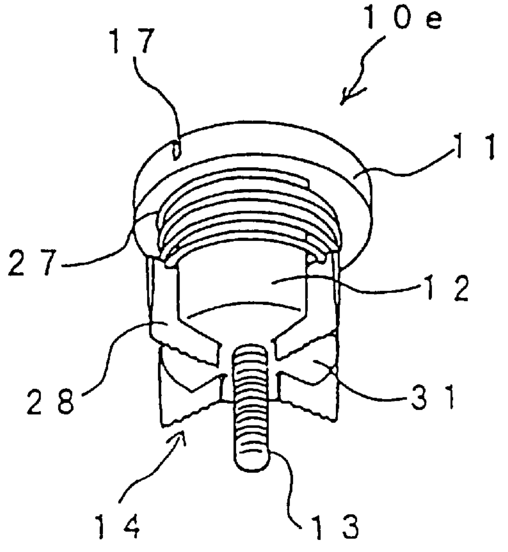
FIG. 29 is a perspective view of still another threaded device embodiment according to the invention.
Figure 30:
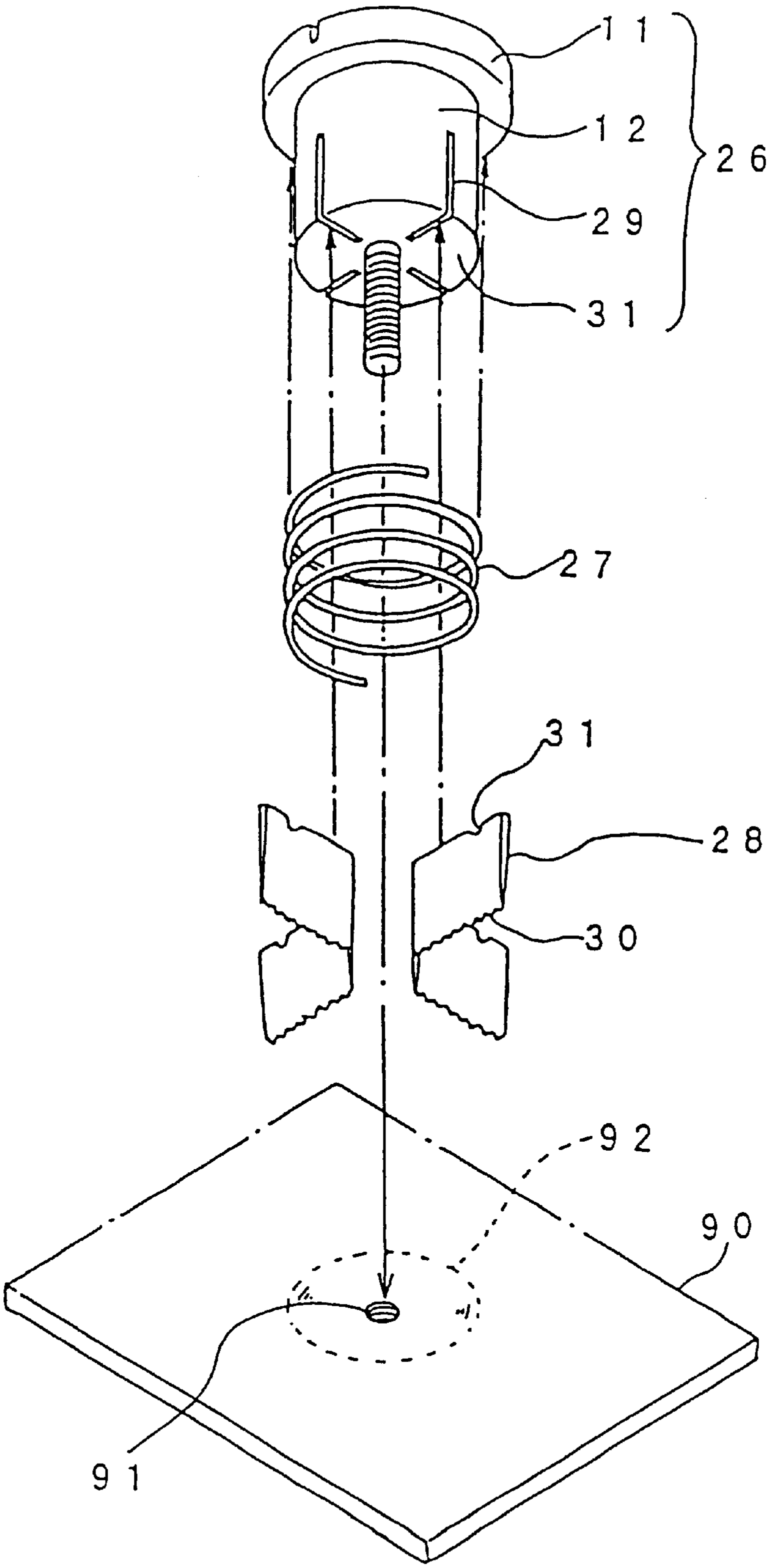
FIG. 30 is a perspective view of the threaded device of FIG. 29 in relation to a plate to which it can be mounted.
Figure 31:
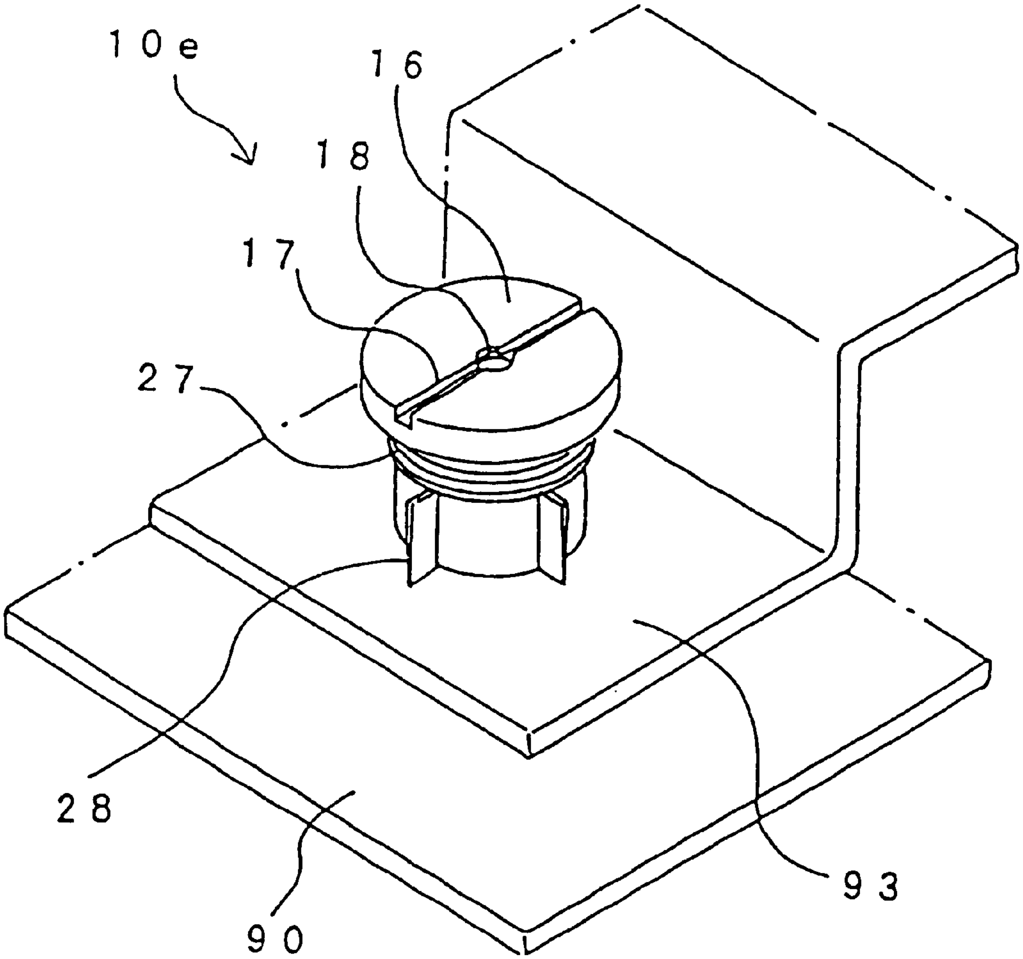
FIG. 31 shows the threaded device of FIG. 29 in alternative mounting.

FIGS. 29 and 31 show a threaded device 10*e* having a plurality of serration plates 28 engaged in holder cuts 29 provided in its bolt neck 12. These serration plates 28 have serration portions 14 along an edge, which partially protrude from the holder cuts 29. A coil 27 is additionally provided on the bolt neck 12 between a bolt head 11 and the serration plates 28 to resiliently press the serration plates 28 against a surface of a conductor plate 90. The bolt head 11 has a screwdriver groove 17 and an axial screw hole 18.

The serration plates 28 will resiliently retreat further into the holder cuts 29 when pushed back by the conductor plate 90 as the bolt shaft 13 of the threaded device 10*e* advances through a conductive hole 91 prepared in the conductor plate 90, while providing a scraped area 92 on the conductor plate 90. The serrations 30 of the serration plates 28 will completely enter the holder cuts 29 when the conductor contact face 31 of the threaded device 10*e* contacts the conductor plate 90.

FIG. 31 shows a state of the threaded device 10*e* mounted on a first plate 93 having electrical connection therewith, whose bolt shaft 13 is screwed into a screw hole (not shown) of a second plate 90 under the first plate 93, providing electrical connection between the two plates 90 and 93.

Embodiment 7

Figure 32:
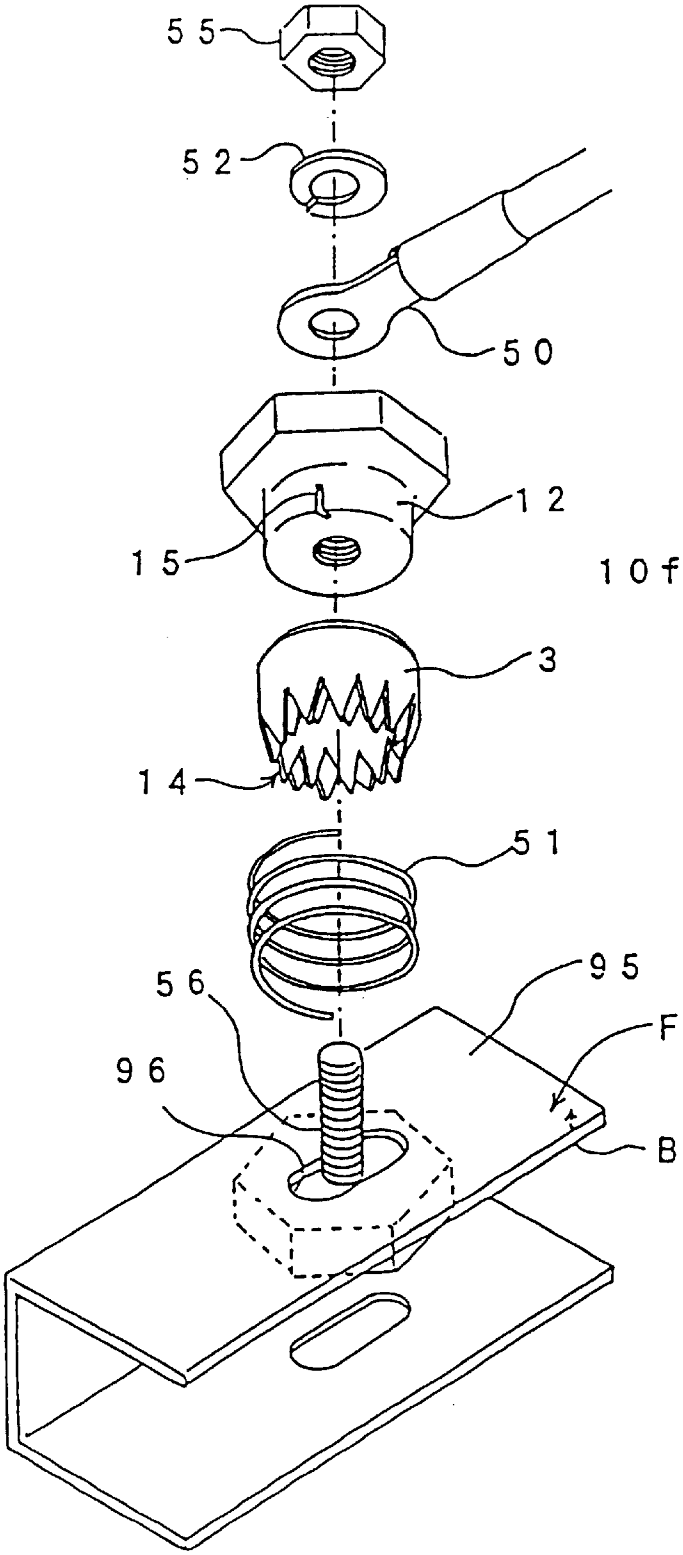
FIG. 32 is an exploded perspective view of a nut device in accordance with the invention as mounted on a surface.

FIG. 32 shows an arrangement of a threaded device 10*f* which is a nut device having a hexagonal head with an axial threaded hole, a nut neck 12 and a serration portion 14 provided around the nut neck 12. A coil 51 is provided over the serration portion 14 to bend the serration inwardly when pressed on a conductor surface. As in other embodiments utilizing such a coil, the coil 51 shrinks as the serration device 3 is deformed.

This nut device 10*f* is often used on an angled conductor frame 95 having through holes or openings 96 as shown in FIG. 32. A receiver bolt 56 is inserted into the opening 96 from an inner face B of the angled frame 95 and receives the nut device 10*f* on an outer face F the threaded device 10*f* scrapes a portion of the upper face F of the frame 95 and removes an insulation substance from the portion A cable terminal 50 may be fixed on the nut head with a bolt (not shown) screwed into the nut hole in the manner previously described.

Embodiment 8

Figure 33:
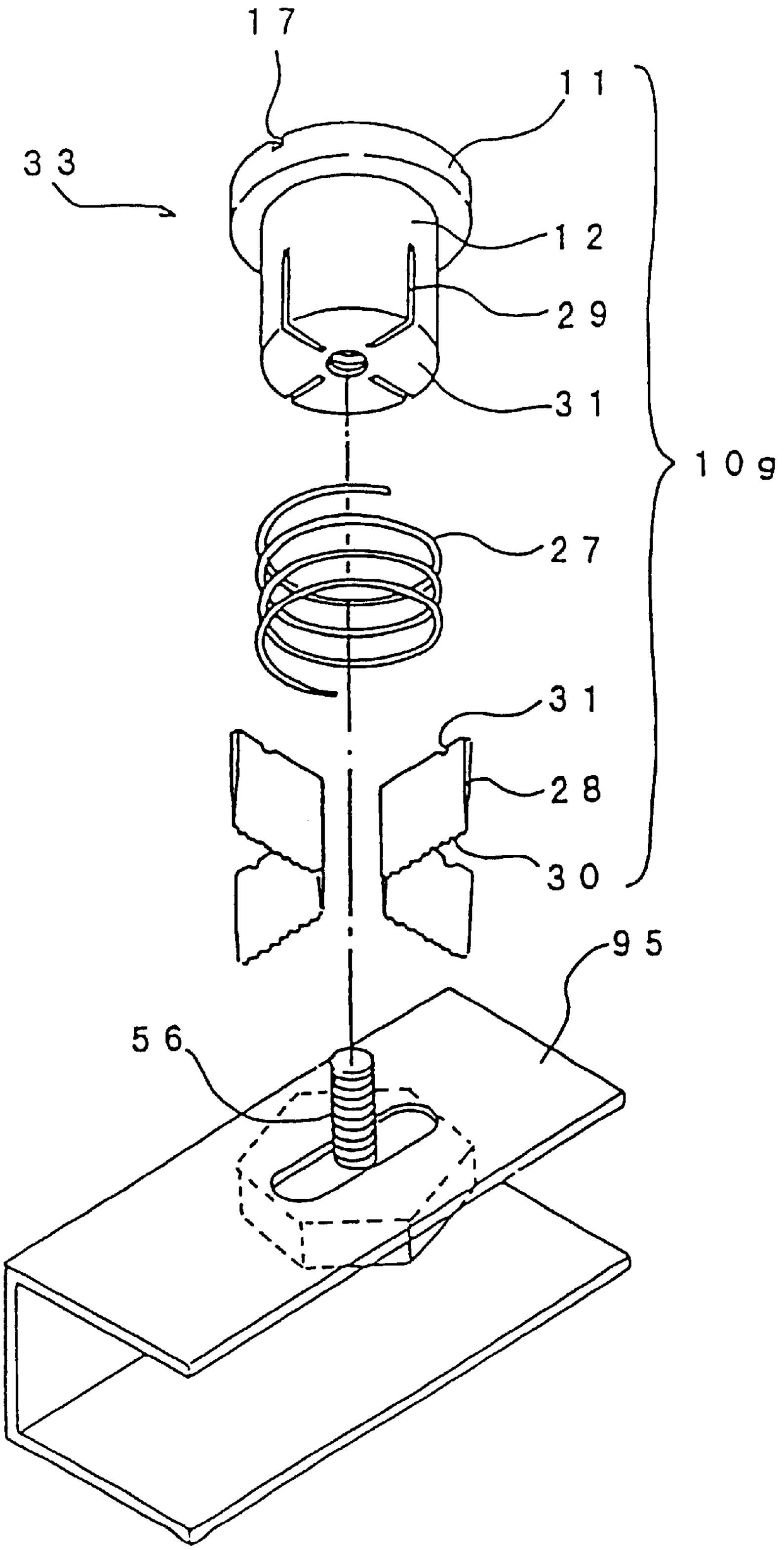
FIG. 33 is a view similar to FIG. 32, showing an alternative embodiment of a nut device of the invention.

FIG. 33 shows another nut-type threaded device 10*g* or nut device 33, which is a modification of the threaded device 10*f*. This threaded device uses serration plates 28 having serrations 30, instead of a serration device 3, received in holder cuts 29 formed in its nut neck 12 as previously defined.

The nut device 33 is received by a receiver bolt 56 inserted into a through hole provided in a conductor plate from below as shown in the figure. The serration plates 28 remove an insulation substance from a conductor surface portion 95.

Figure 34:
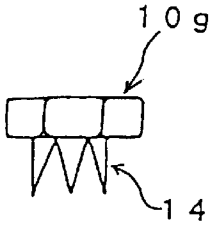
FIG. 34 is another alternative embodiment of a nut device in accordance with the invention.

FIG. 34 shows a modification of the nut device 10*g*. The serration portion of this embodiment is provided directly on its head portion in a unit by appropriately cutting out the serration from the head portion.

Embodiment 9

Figure 35A:
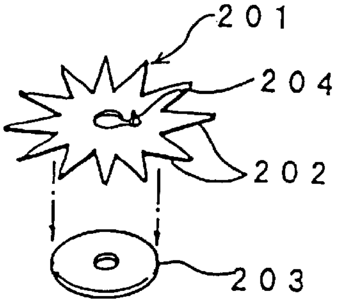
FIGS. 35(*a*), (*b*) and (*c*) are perspective views of a washer-incorporated threaded device according to the invention, in various stages of assembly.
Figure 35B:
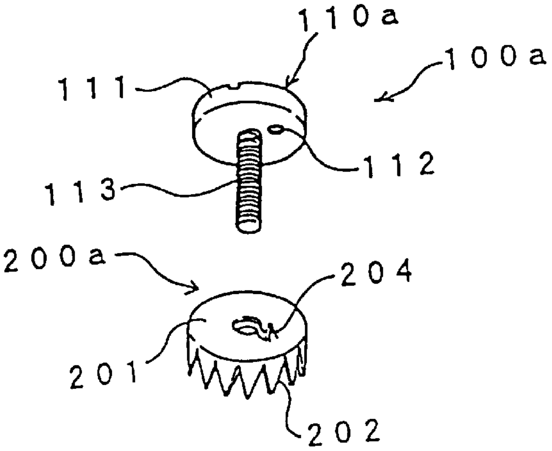
Figure 35C:
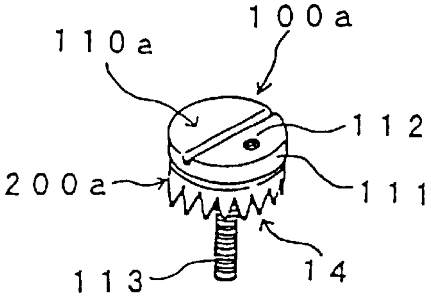

FIG. 35 shows a washer-incorporated threaded device 100*a* incorporating a washer device 200*a* on a bolt 110*a*. The washing device 200*a* is provided by pressing and deforming a serration member 201 having a circumferential serration 202 and an engagement hook 204 onto a serration base 203.

The engagement hook 204 is formed around its center opening to engage a stop hole 112 provided in the bolt head 111 if a bolt 110*a* or threaded device 100*a* having a bolt shaft 113 when the center opening of the washer device 200*a* engages the bolt shaft 113 to provide a synchronous movement of the bolt 110*a* and the washer device 200*a*. FIG. 35 (*c*) shows a completed washer-incorporated threaded device 100*a* also having a diametrical screwdriver groove.

Embodiment 10

FIG. 36 shows another washer-incorporated threaded device 100*b* incorporating a washer device 200*b* on a bolt 100*b*. The washer device 200*b* has a head 211 and a neck 212 having a serration member 1 thereafround. The head 211 has a pin receiver hole 213 to engage a pin hole 114 provided in the bolt head 111 of the bolt 110*b* through a pin 115 to synchronously turn the bolt 110*b* and the washer device 200*b*. The bolt head 111 has a diametrical groove and an axial hole.

Embodiment 11

Figure 37:
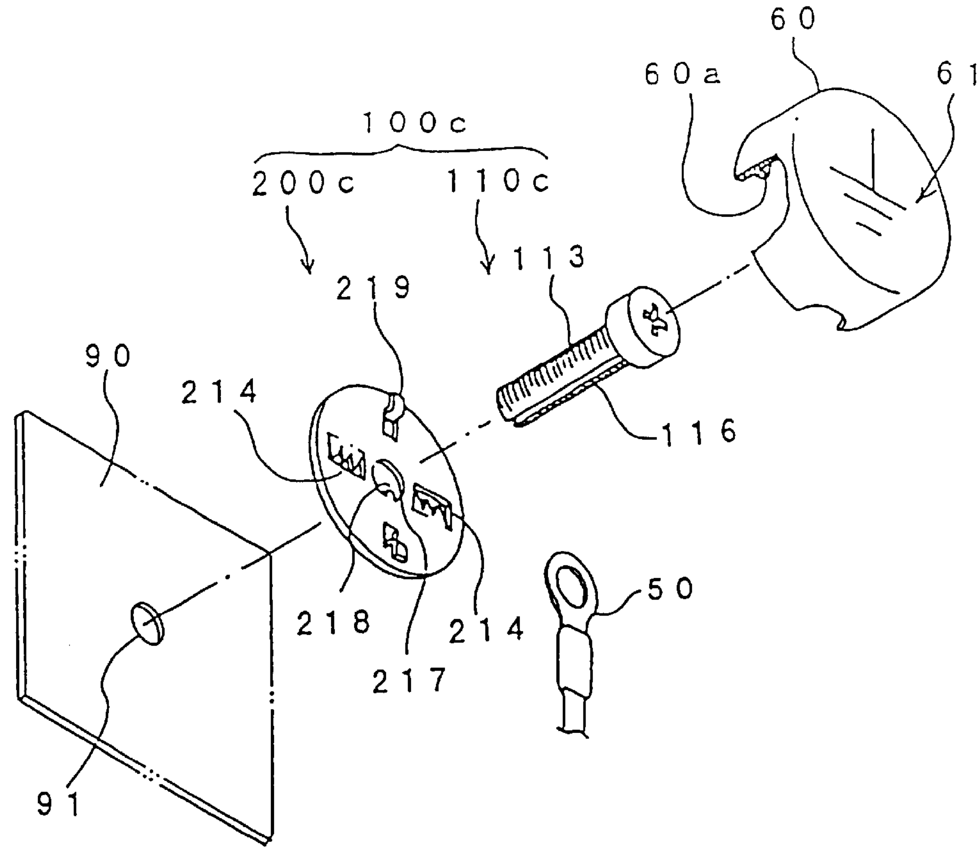
FIG. 37 an exploded perspective view of another washer-incorporated threaded device in accordance with the invention.
Figure 38:
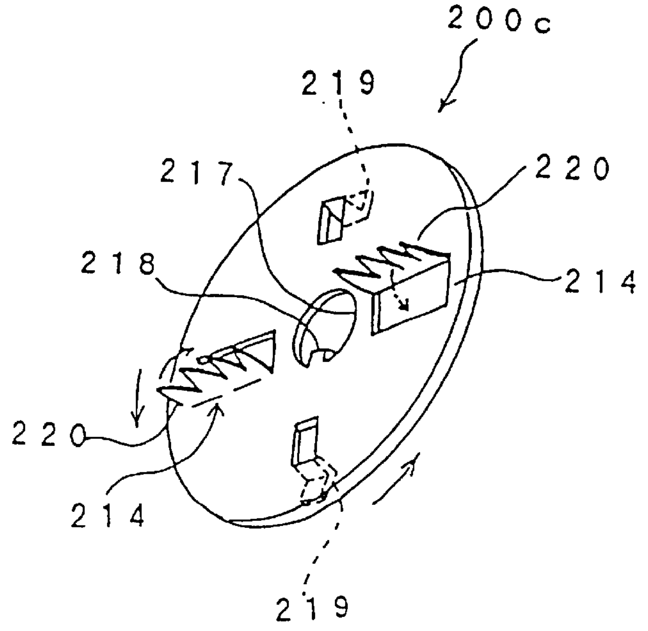
FIG. 38 shows the washer element of the threaded device of FIG. 37.

FIG. 37 shows a washer-incorporated threaded device 100*c* incorporating a washer device 200*c* on a bolt 110*c*. The bolt 110*c* has a longitudinal stop groove 116 formed on its bolt shaft 113 as shown. The washer device 200*c* has serration cuts 214 formed such that the serration cuts 214 can scrape a surface portion of a conductor plate 90 to remove an insulating substance from the surface portion. The washer device 200*c* has a center hole 217 having a center stop 218 as clearly shown in FIG. 38, which engages the stop groove 116 when the bolt shaft 113 is inserted into the center hole 217. The bolt shaft 113 is inserted into a conductive hole 91 prepared in the conductor plate 90.

Figure 39:
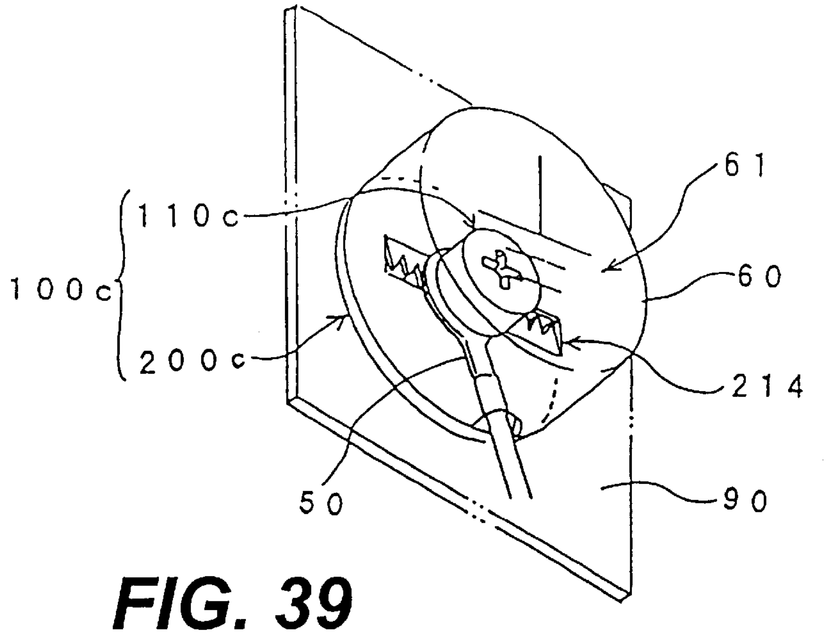
FIG. 39 shows the washer-incorporated thread device of FIG. 37 in assembled form.

A cable terminal 50 is mounted on the bolt shaft 113 for electrical connection with the conductor plate 90, and a generally transparent plastic cover 60 having markings 61 thereon such as an indication of grounding may be provided on the threaded device 100*c* for convenience and protection of the threaded device. The cover 60 is provided with hooks 60*a* on its inner wall to engage projections 219 formed on the washer device 200*c*. FIG. 39 shows the threaded device 100*c* as attached on the conductor plate 90, which is covered by the plastic cover 60. The cover 60 is provided with an opening on its side wall to allow the cord extending from the terminal 50 to extend outwardly from the threaded device 100*c*.

Embodiment 12

Figure 40:
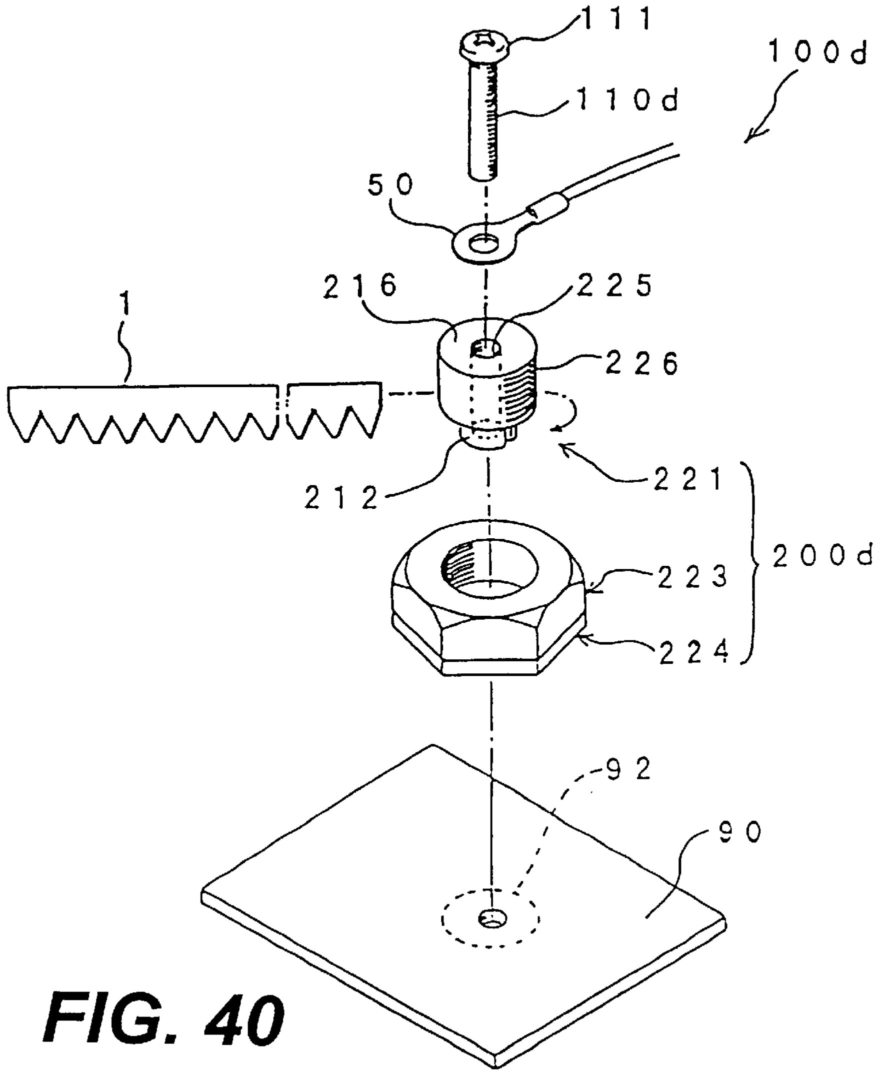
FIG. 40 is an exploded perspective view of yet another washer-incorporated threaded device of the invention.

FIG. 40 shows another washer-incorporated threaded device 100*d* incorporating a washer device 200*d* on a bolt 110*d*. This device 100*d* comprises a bolt 110*d* having a bolt head 111 and a bolt shaft and a washer device 200*d*. The washer device 200*d* comprises a washer member 221 having a threaded center hole 225 and a thread 226 on its outer wall, a nut 223 and a packing plate 224. Its washer member 221 has a neck 212 on which a serration member 1 is fixedly wound.

The bolt 110*d* is screwed into the threaded hole 225 of the washer member 221, which is screwed into the nut 223 and the packing plate 224. The bolt 110*d* reaches and is screwed into a hole provided in a conductor plate 90 and the serration member 1 provides a scraping on a surface portion of the conductor plate 90 and provides a scraped area 92 on the surface portion. The packing plate 224, typically about 1 mm thick, provides protection of the scraped area. A cable terminal 50 is provided on the bolt 110*d* for providing electrical connection with the conductor plate 90.

Embodiment 13

Figure 41:
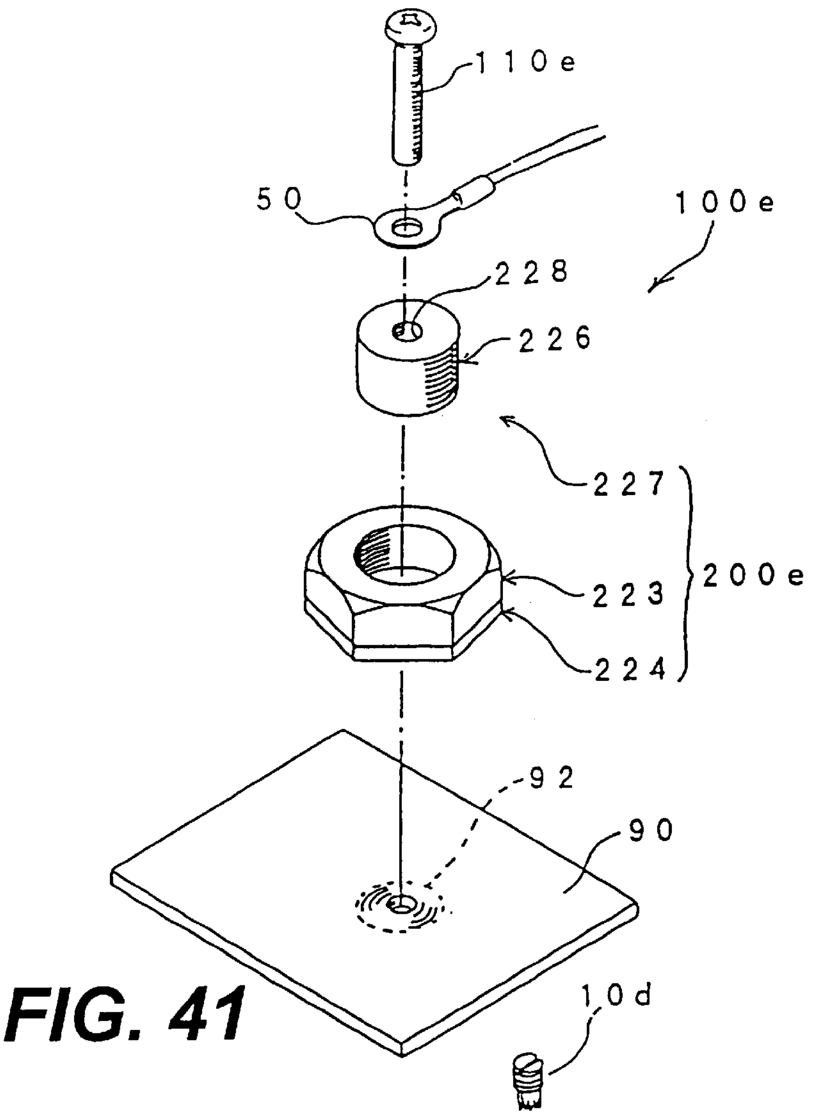
FIG. 41 is a further embodiment of the washer-incorporated threaded device of FIG. 40.

FIG. 41 shows another washer-incorporated threaded device 100*e* incorporating a washer device 200*e* on a bolt 110*e*, which is similar to the washer-incorporated threaded device 100*d*. However, this device 100*e* does not utilize a serration member 1. This device 100*e* is used where a scraped area 92 or conductive surface is already provided on a conductor plate 90 so that the threaded device 100*e* can protect the scraped area from degrading.

Embodiment 14

FIGS. 42 to 50 show a connector device 300 and various types of terminal plates 301. Such a connector device 300 is connected to a connection 81 of a cable conduit 80 through a plate hole 97 of a conductor plate 90 shown in FIG. 43 to provide electrical connection between the conduit 80 and the conductor plate 90. This embodiment connector device 300 comprises a terminal plate 301, a nut 10*d* having a serration, and a nut device 333.

Figure 42:
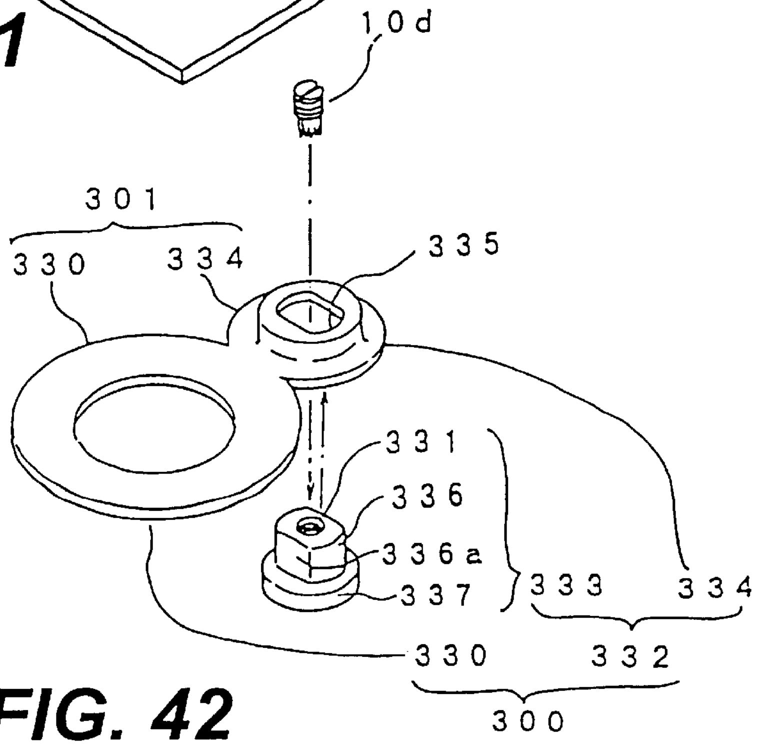
FIG. 42 shows a connector device in accordance with the invention.

The terminal plate 301 has a holder ring 330 having a hole for fixedly engaging the connection 81 and the attachment portion 334 having a raised opening 335. In this embodiment, the opening 335 is of a track shape to unturnably hold the nut device 333 having a correspondingly shaped nut body 336 therein as shown in FIG. 42.

Figure 43:
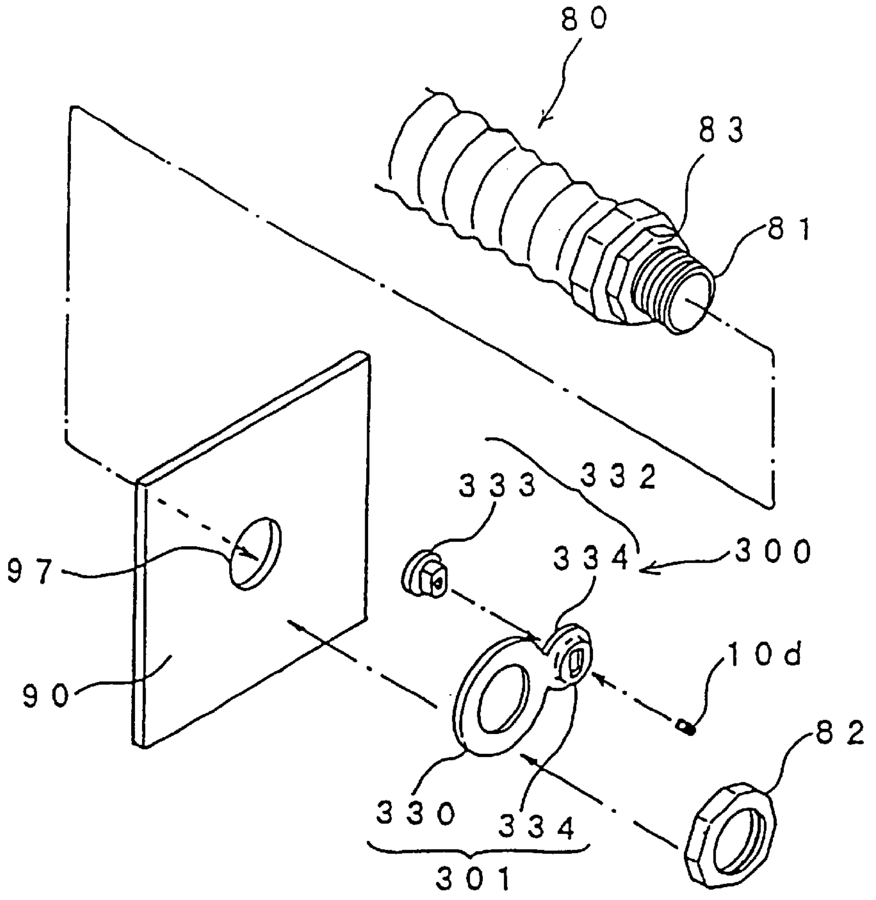
FIG. 43 is an exploded perspective view of the connector device of FIG. 42 incorporated into a connection structure.
Figure 44:
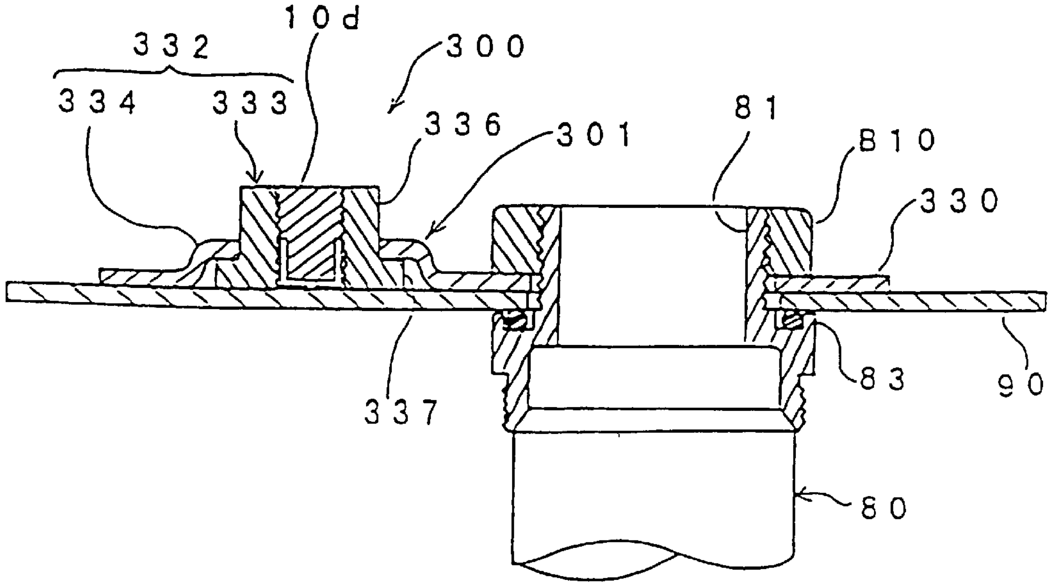
FIG. 44 is a sectional view of the connector device of FIG. 42 in assembled form.

A threaded device 10*d* having a serration is screwed into the nut device 333 through the opening 335 to provide scraping on the conductor plate 90. A nut ring 82 engages the connection 81 and fastens the cable conduit 80 on the conductor plate 90 as shown in FIGS. 43 and 44.

Figure 45:
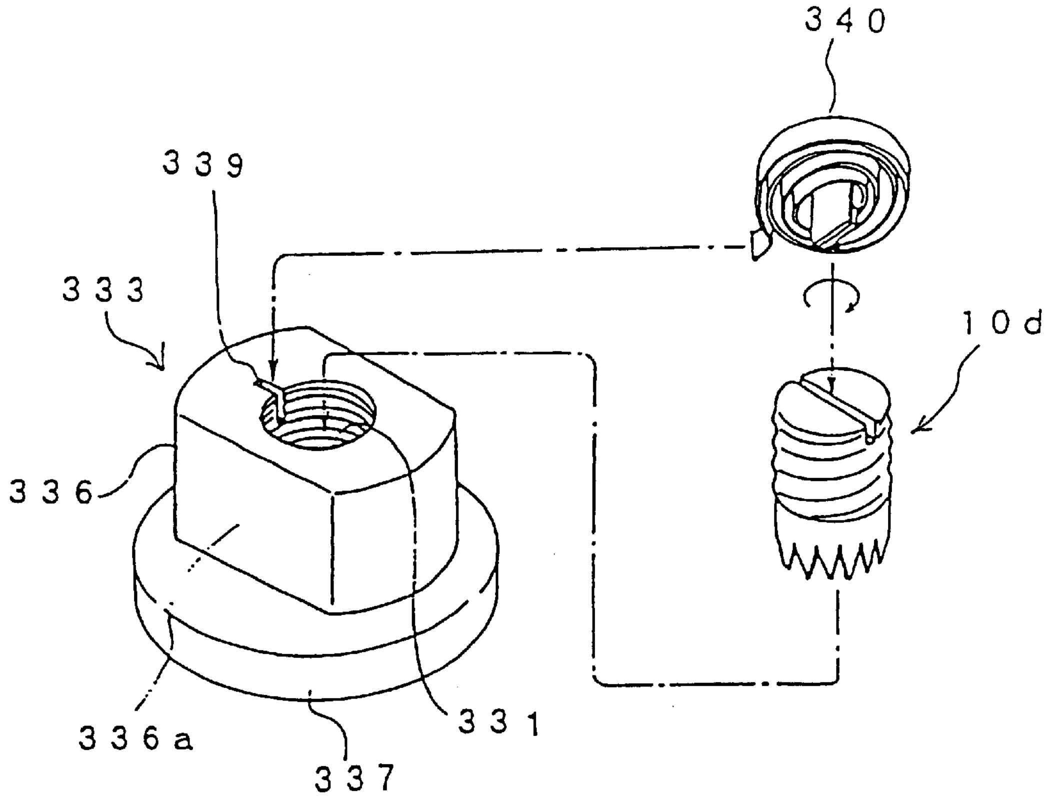
FIG. 45 is an exploded perspective view of an alternative nut device embodiment of the invention on which a spring is mounted.
Figure 46:
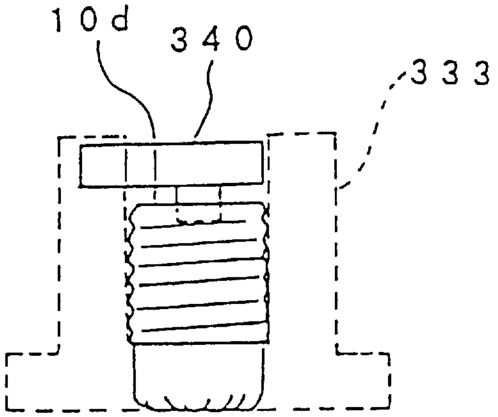
FIG. 46 shows the FIG. 45 embodiment in assembled form.

A nut device 333 shown in FIG. 45 is further provided with a spring groove 339 to engage a spring 340 and hold the threaded device 10*d* resiliently as shown in FIG. 46 so that the threaded device 10*d* screwed into the nut device 333 does not loosen within the nut device.

Figure 47:
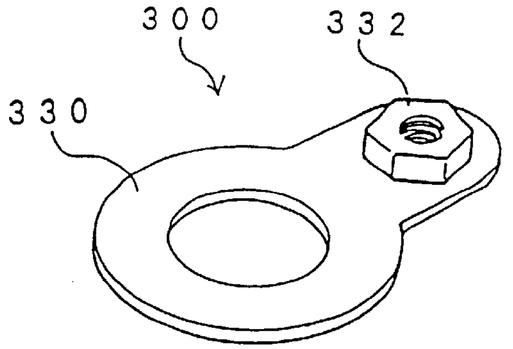
FIG. 47 shows an alternative embodiment of the connector device of FIG. 42.
Figure 48:
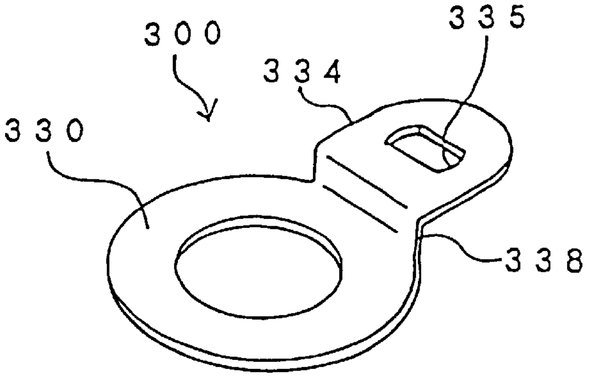
FIG. 48 yet another embodiment of the connector device of FIG. 42.
Figure 49:
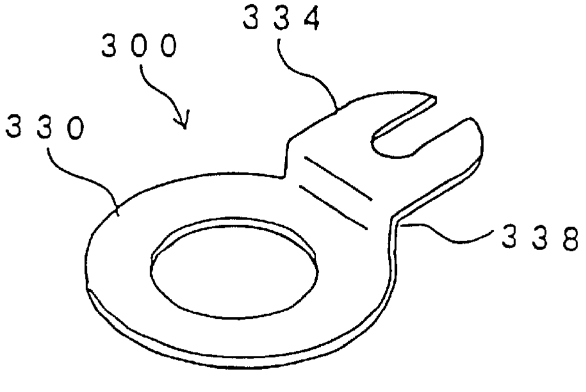
FIG. 49 shows still another embodiment of the connector device of FIG. 42.

It is possible to replace the raised opening 335 of the terminal device 301 with a nut portion 332 as shown in FIG. 47. It is also possible to provide a step 338 on the terminal device 301 instead of raising the opening 335. The terminal device 301 may have a step 338 and a cut portion instead of a hole as shown in FIG. 49.

Figure 50:
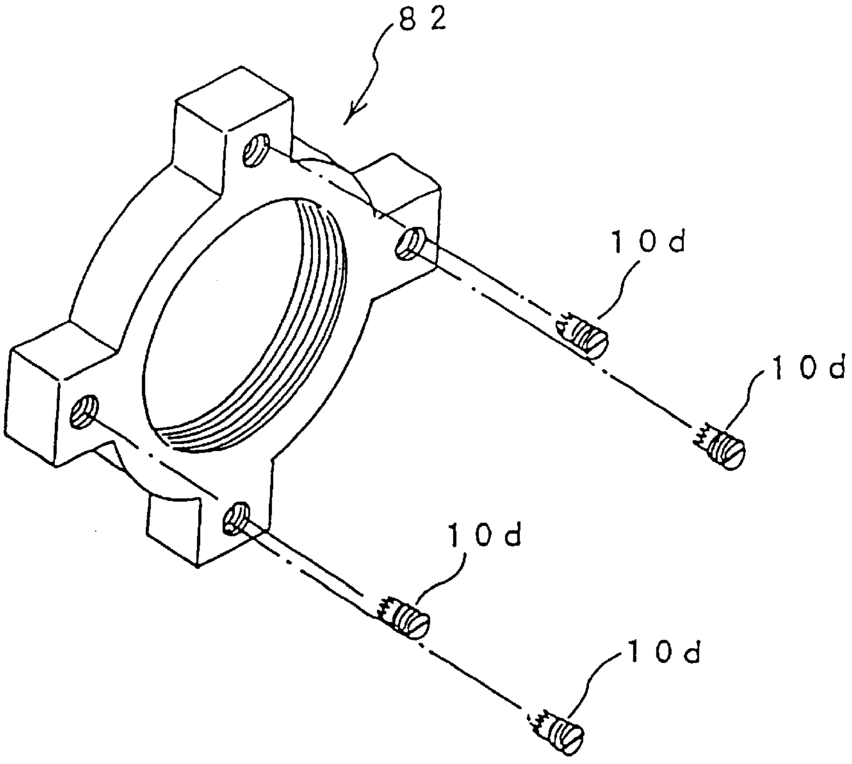
FIG. 50 shows the use of multiple bolt devices of FIG. 12.

FIG. 50 shows another embodiment. In this embodiment, a lock nut 82 is used to link the cable pipe 80 through the plate hole 97 of the conductor plate 90 (see FIGS. 43 and 44). A plurality of threaded members 10*d*, each having serration, are screwed into threaded holes formed in the lock nut 82 and respectively scrape surface portions of the conductor plate 90 to provide efficient electric connection between the conductor plate 90 and the conduit 80.

Embodiment 15

Figure 51:
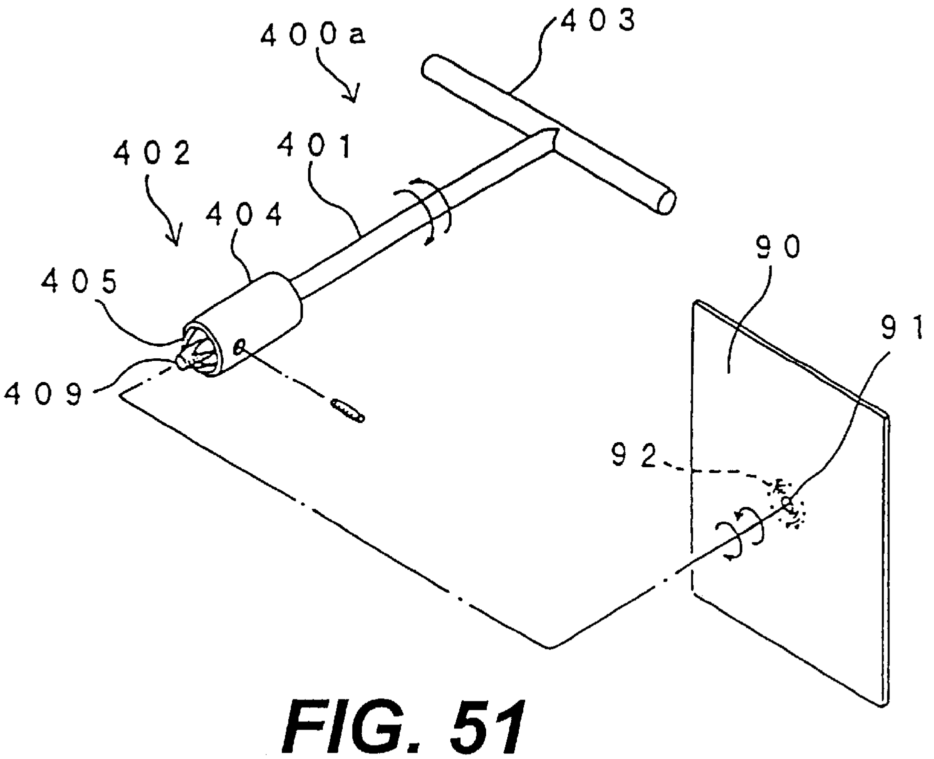
FIG. 51 shows a scraper tool constructed according to the invention.
Figure 52A:
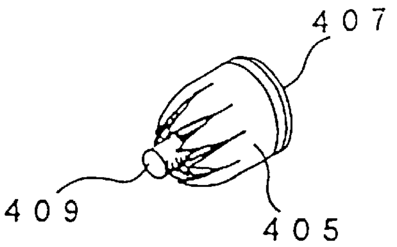
FIGS. 52(*a*) and (*b*) show the serration portion of the scraper tool of FIG. 51.
Figure 52B:
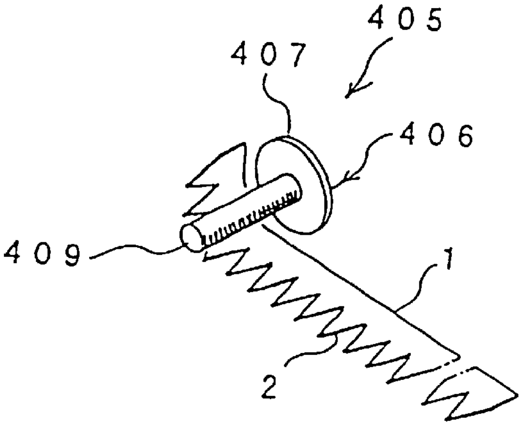

Various embodiments for scraper devices are shown in FIGS. 51 and 52. FIG. 51 shows a scraper device 400*a* comprising a shaft 401, a grip handle 403, and a scraper portion 402. The scraper portion 402 comprises a cylindrical holder 404 enclosing a serration device 405 having threaded shaft 409. The serration device 405 is fixed inside the cylindrical holder 404 with a pin or pins. The threaded shaft 409 is engaged with a threaded hole 91 provided in a conductor plate 90 and the grip handle 403 is turned by hand such that the serration device 405 provides a scraped area 92 on the conduction plate 90.

This scraper device 400*a* can provide very secure scraping on a conductor plate where other serration devices according to the present invention may not easily do so.

The serration device 405 of this embodiment is prepared as shown in FIG. 52, having a dome-like serration over the threaded shaft 409 under its head portion 407.

Embodiment 16

Figure 53:
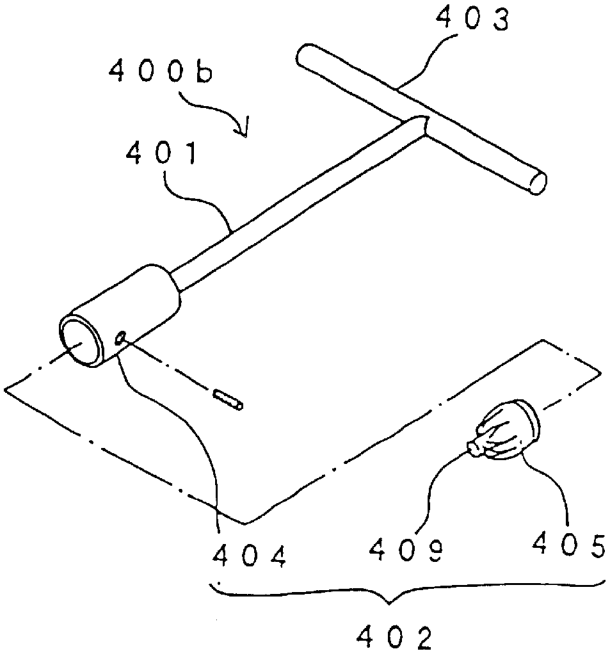
FIG. 53 is another embodiment of the scraper tool of FIG. 51.
Figure 54:
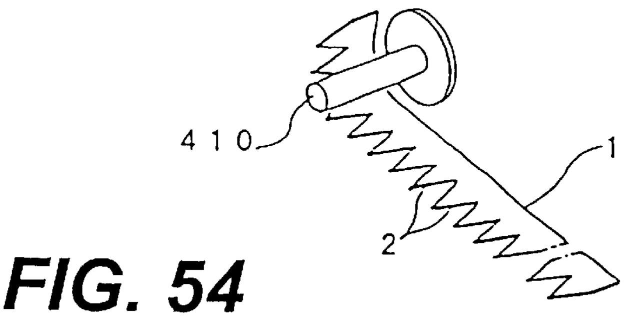
FIG. 54 shows the serration portion of the scraper tool of FIG. 53.

FIGS. 53 and 54 show another scraper device 400*b* which is similar to the scraper device 400*a*. In this embodiment, the shaft 401 is not threaded as shown in FIG. 54 and engages a hole provided in a conductor plate. Therefore, its handle need be pressed and turned by hand to provide an appropriate scraped area on the conductor plate.

Embodiment 17

Figure 55:
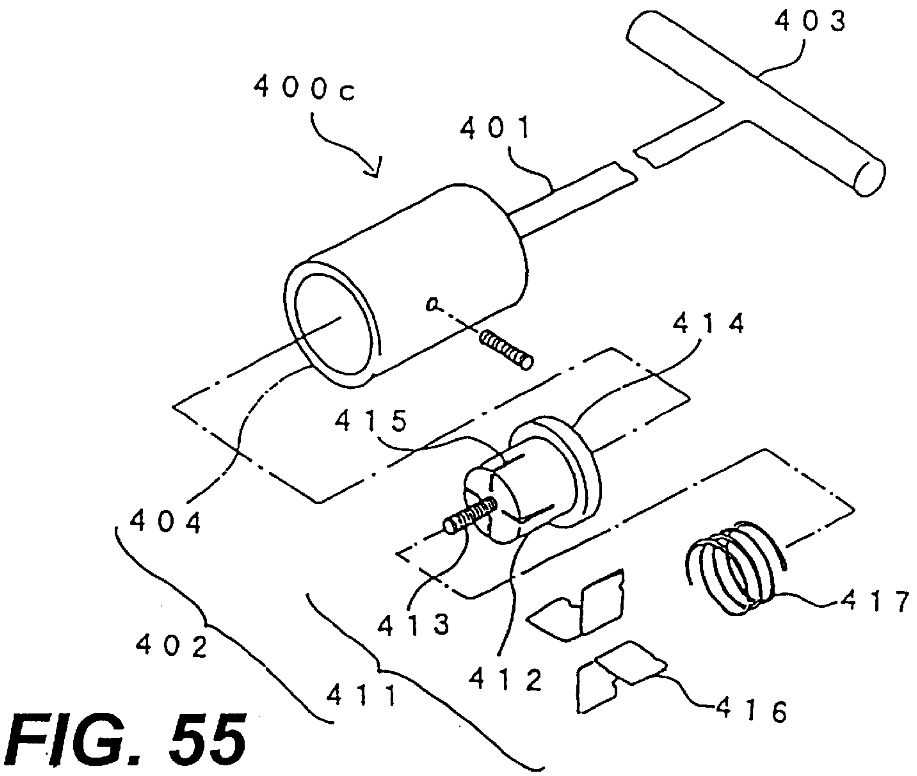
FIG. 55 is an exploded view of an alternative embodiment of a scraper tool according to the invention.

FIG. 55 shows another scraper device 400*c* which is similar to the previously described scraper devices 400*a* and 400*b*. In this embodiment, a different type of scraper member 411 is provided. This scraper member 411 comprises a serration device having a head 414, a neck 412 and a threaded shaft 413. In the neck 412 is provided cuts 415 to receive serration plates 416. A spring 417 is additionally provided on the neck 412 to press and resiliently receive the serration plates 416. The serration plates 416 gradually retreat into the neck 412 as they provide further scraping on a conductor surface as set forth. The serration device is received within a cylindrical holder of the scraper device 400*c*.

Embodiment 18

Figure 56:
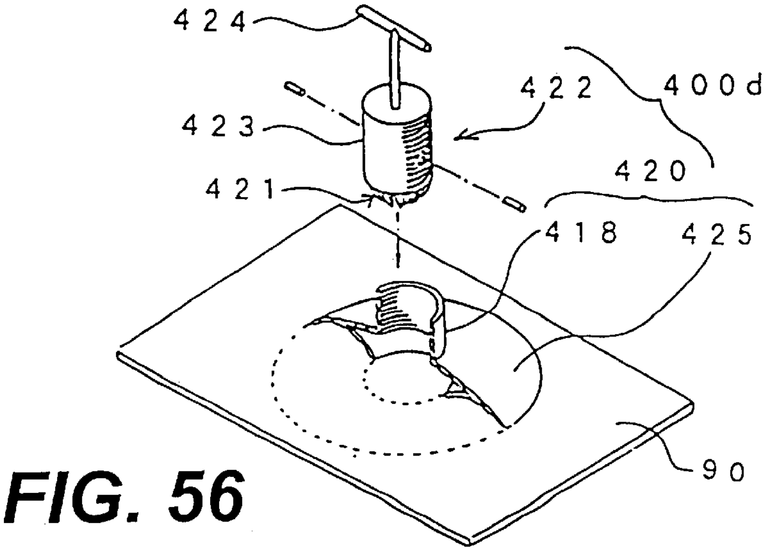
FIG. 56 yet another scraper tool embodiment according to the invention.

FIG. 56 shows still another scraper device 400*d* which is substantially different from those described in the above. This device 400*d* utilizes an absorber disk 425 and can be used where there is no hole provided in a conductor plate as the absorber disk 425 can stably hold the scraper device 400*d*.

The scraper device 400*d* comprises a handle 424 and a threaded member 422 having a cylindrical threaded wall 423 and a serration 421 which is held within the threaded wall 423 by means of pins. The threaded wall 423 engages the threaded inner wall of the absorber disk 425 to be tightly held therein. The handle 424 is turned by hand and the serration 421 removes an insulation substance from a surface portion of the conductor plate 90. A magnet (not shown) may be appropriately utilized instead of such an absorber disk 425.

Those serrations can be made from a shape memory alloy to allow their repeated use. Though not shown, a spring may be additionally utilized to press the serrations against a conductor surface for an improved scraping operation.

In view of the above detailed description, modifications and improvements may occur to those skilled in the art which are within the spirit and scope of the appended claims. Accordingly, the invention is to be limited only by the claims and equivalents thereto.

What is claimed is:

1. A conductive threaded device comprising:

a plurality of serration elements, wherein said serration elements are structured and shaped to abrade a conductor surface and to be deformable and capable of providing a substantially planar contact face when the threaded device is firmly mounted on the conductor surface.

2. The threaded device according to claim 1, wherein said serration elements are provided by a serration member of a bendable metal plate to be made into a cylindrical serration, device for providing scraping on a conductive plate to provide electrical conduction therewith, having a serration portion along a longitudinal edge.

3. The threaded device according to claim 1, wherein said serration elements are provided by a serration member of a bendable metal plate to be made into a cylindrical serration device for providing scraping on a conductive plate to provide electrical conduction therewith, having a serration portion along a longitudinal edge, wherein said metal plate is a conductive shape memory alloy plate having a memory of its original shape so that said serration portion can restore its original shape after use.

4. The threaded device according to any one of claims 1 to 3, wherein said threaded device is a bolt device comprising a head and a shaft, said head having an axial threaded hole and said serration means provided on said bolt device over said shaft.

5. The threaded device according to claim 4, where said head is further provided with an outer thread.

6. The threaded device according to claim 5, further comprising a nut to engage said head and a packing member to be provided on said nut on its conductor surface contact face to provide protection of a scraped area.

7. The threaded device according to any one of claims 1 to 3, wherein said threaded device is a bolt device having a shaft and said serration means is provided on the distal end of said shaft.

8. The threaded device according to claim 1, wherein said serration means is provided by a washer member coupled to said threaded device for rotation therewith, said washer member comprising a washer body and serration means protruding from said washer body, said serration means being deformable in use to eventually provide a substantially flat surface.

9. The washer device according to claim 8, wherein said serration means is provided by a serration member of a bendable metal plate to be made into a cylindrical serration device for providing scraping on a conductive plate to provide electrical conduction therewith, having a serration portion along a longitudinal edge.

10. The washer device according to claim 8, wherein said serration means is provided by a serration member of a bendable metal plate to be made into a cylindrical serration device for providing scraping on a conductive plate to provide electrical conduction therewith, having a serration portion along a longitudinal edge wherein said metal plate is a conductive shape memory alloy plate having a memory of its original shape so that said serration portion can restore its original shape after use.

11. The washer device according to claim 8, wherein said serration means is provided on said washer body by punching means.

12. The washer device according to claim 8, wherein said washer body is a cylindrical body having an outer thread and an axial inner thread, further comprising a packing means to provide protection of a scraped area on a conductor surface.

13. A conductive threaded device having a serration means, wherein said threaded device is a bolt device having a head and said serration means comprises at least one serration plate mounted in a serration plate holder provided under said head, which is biased by a coil, said serration plate being resiliently provided in said serration holder and being retreatable into said serration holder when pressed back on a conductor surface.

14. The threaded device according to any one of claims 1 to 3, wherein said threaded device is a nut device.

15. A conductive threaded device having a serration means, wherein said threaded device is a nut device and said serration means comprises at least one serration plate mounted in a serration plate holder provided under said head, which is biased by a coil, said serration plate being resiliently provided in said serration holder and being retreatable into said serration holder when pressed back on a conductor surface.

* * * * *